(12) United States Patent
Huang et al.

(10) Patent No.: US 9,626,970 B2
(45) Date of Patent: Apr. 18, 2017

(54) SPEAKER IDENTIFICATION USING SPATIAL INFORMATION

(71) Applicant: Dolby Laboratories Licensing Corporation, San Francisco, CA (US)

(72) Inventors: Shen Huang, Beijing (CN); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/971,401

(22) Filed: Dec. 16, 2015

(65) Prior Publication Data

US 2016/0180852 A1    Jun. 23, 2016

Related U.S. Application Data

(60) Provisional application No. 62/128,264, filed on Mar. 4, 2015.

(30) Foreign Application Priority Data

Dec. 19, 2014  (WO) ................ PCT/CN2014/094409

(51) Int. Cl.
*G10L 17/00* (2013.01)
*G10L 15/30* (2013.01)
(Continued)

(52) U.S. Cl.
CPC ............ *G10L 17/005* (2013.01); *G10L 15/30* (2013.01); *G10L 25/24* (2013.01); *G10L 25/78* (2013.01)

(58) Field of Classification Search
CPC ......... G10L 17/00; G10L 17/02; G10L 17/04; G10L 17/06; G10L 17/08; G10L 17/10; G10L 17/12; G10L 17/16; G10L 17/26

USPC ................ 704/246, 247, 249, 250
See application file for complete search history.

(56) References Cited

U.S. PATENT DOCUMENTS 6,104,995 A     8/2000  Shimada
6,400,310 B1    6/2002  Byrnes
(Continued)

FOREIGN PATENT DOCUMENTS

CN      1787076      6/2006
CN    103337241      2/2013
(Continued)

OTHER PUBLICATIONS

Blum, K. et al "Spatial Audio to Assist Speaker Identification in Telephony" IWSSIP 2010—17th International Conference on Systems, Signals and Image Processing, 2008.
(Continued)

*Primary Examiner* — Qi Han

(57) ABSTRACT

Embodiments of the present invention relate to speaker identification using spatial information. A method of speaker identification for audio content being of a format based on multiple channels is disclosed. The method comprises extracting, from a first audio clip in the format, a plurality of spatial acoustic features across the multiple channels and location information, the first audio clip containing voices from a speaker, and constructing a first model for the speaker based on the spatial acoustic features and the location information, the first model indicating a characteristic of the voices from the speaker. The method further comprises identifying whether the audio content contains voices from the speaker based on the first model. Corresponding system and computer program product are also disclosed.

17 Claims, 11 Drawing Sheets

(51) Int. Cl.
*G10L 25/24* (2013.01)
*G10L 25/78* (2013.01)

(56) References Cited

U.S. PATENT DOCUMENTS

| | | | |
|---|---|---|---|
| 6,411,930 B1 | 6/2002 | Burges | |
| 8,583,428 B2 | 11/2013 | Tashev | |
| 8,756,061 B2 | 6/2014 | Kalinli | |
| 2007/0263823 A1 | 11/2007 | Jalava | |
| 2008/0052074 A1* | 2/2008 | Gopinath | G10L 15/142 704/256 |
| 2008/0260131 A1 | 10/2008 | Akesson | |
| 2009/0119103 A1 | 5/2009 | Gerl | |
| 2009/0220065 A1* | 9/2009 | Ahuja | H04M 3/569 379/202.01 |
| 2011/0004473 A1 | 1/2011 | Laperdon | |
| 2012/0239400 A1* | 9/2012 | Koshinaka | G10L 17/16 704/249 |
| 2014/0114660 A1* | 4/2014 | Zhang | G10L 17/06 704/240 |
| 2014/0118472 A1 | 5/2014 | Liu | |
| 2014/0236593 A1 | 8/2014 | Wu | |
| 2014/0241528 A1 | 8/2014 | Gunawan | |
| 2014/0244257 A1 | 8/2014 | Colibro | |
| 2014/0278417 A1* | 9/2014 | Chen | G10L 17/06 704/246 |

FOREIGN PATENT DOCUMENTS

| | | |
|---|---|---|
| EP | 2048656 | 4/2009 |
| JP | 2007-233239 | 9/2007 |
| KR | 2008-0023033 | 3/2008 |

OTHER PUBLICATIONS

Kilgore, R. et al "Listening to Unfamiliar Voices in Spatial Audio: Does Visualization of Spatial Position Enhance Voice Identification?" 20th International Symposium on Human Factors in Telecommunication, Sophia, Antipolis, France, Mar. 20-23, 2006.

Campbell, W.M. et al "Support Vector Machines for Speaker and Language Recognition" Computer Speech and Language, vol. 20, Issues 2-3, Apr.-Jul. 2006, pp. 210-229.

Hammer, F. et al "Elements of Interactivity in Telephone Conversations" Interspeech, 8th International Conference on Spoken Language Processing, Oct. 4-8, 2004.

Hoeldtke, K. et al "Conversation Analysis of Multi-party Conferencing and its Relation to Perceived Quality" IEEE International Conference on Communications, Jun. 5-9, 2011, pp. 1-5.

McCowan, I. et al "Robust Speaker Recognition Using Microphone Arrays" The Speaker Recognition Workshop, Crete, Greece, Jun. 18-22, 2001.

Chandrasekhar, V. et al "Automatic Language Identification in Music Videos with Low Level Audio and Visual Features" IEEE International Conference on Acoustics, Speech and Signal Processing, pp. 5724-5727, May 22-27, 2011.

Allen, F. et al "Language Identification Using Warping and the Shifted Delta Cepstrum" IEEE 7th Workshop on Multimedia Signal Processing, Oct. 30, 2005-Nov. 2, 2005, pp. 1-4.

Jiaming, Y. et al "Application of EMD-SDC in Airplane Conjunction Speech Recognition System" Computer Engineering and Applications, vol. 48, No. 8, pp. 137-140, Mar. 2012.

Lawson, A. et al "Improving Language Identification Robustness to Highly Channel-Degraded Speech through Multiple System Fusion" Proc. of the Annual Conference of the International Speech Communication Association, pp. 1507-1510, Aug. 25-29, 2013, Lyon, France.

Calvo, Jose CR. "Evaluation of Lineal Relation Between Shifted Delta Cepstral Features and Prosodic Features in Speaker Verification" Sep. 9, 2008, Progress in Pattern Recognition, Image Analysis and Applications, pp. 112-119.

Campbell, William, M. "Generalized Linear Discriminant Sequence Kernels for Speaker Recognition" IEEE International Conference on Acoustics, Speech, and Signal Processing Proceedings, May 13-17, 2002, New York, pp. 1-161.

\* cited by examiner

SPEAKER IDENTIFICATION USING SPATIAL INFORMATION

CROSS REFERENCE TO RELATED APPLICATIONS

This application claims priority to International Patent Application No. PCT/CN2014/094409 filed on 19 Dec. 2014, and U.S. Provisional Patent Application No. 62/128,264 filed on 4 Mar. 2015, all hereby incorporated in their entirety by reference.

TECHNOLOGY

Embodiments of the present invention generally relate to audio content processing, and more specifically, to a method and system for speaker identification using spatial information.

BACKGROUND

It is desirable in some scenarios, such as in a multiparty teleconference scenario, to automatically identify who is participating in the conference and which participant(s) is/are currently talking, which can facilitate the communication among the multiple participants, especially when the visual information of the talkers is unavailable. Speaker identification can provide valuable information for the system to provide operations for better user experience, such as speaker dependent quality enhancement. Speaker identification has also been an important tool in meeting transcription.

Generally, it is not a problem to automatically identify which participant(s) is/are currently talking, if each speaker has his or her own telephone endpoint, i.e., where no two participants share the same telephone endpoint. In such a scenario, the telephony system can use respective identifiers of the various endpoints connected to a conference as identifiers of the participants and voice activity detection (VAD) can be used for identifying who is currently talking. For example, if "Adam" is using Endpoint A to participate in a conference, the telephony system can detect voice activity in the uplink stream received from Endpoint A and then recognize that "Adam" is currently talking.

However, it is not straightforward to identify who is participating in the conference and which participant(s) is/are currently talking, if multiple participants join the conference via the same endpoint, for example, if they join the conference via a conference phone in a meeting room. In such a scenario, in order to automatically identify the speakers, one approach is to use speech audio processing to identify the respective voices of different participants.

Traditional speaker identification methods, also referred to as monaural speaker modeling methods, generally relate to monaural telephony systems. By using such methods, all the input audio signals, even signals from the endpoint with multiple channels, may be pre-converted into a monaural audio signal for the subsequent identification process. In this sense, the mono channel based methods do not perform well in a scenario where multiple participants join a conference via the same endpoint with multiple channels. For example, the identification of the respective speakers tends to be less accurate than desirable, or the associated computational burden tends to be too high. Those methods also suffer from various robustness issues, especially when an overlapped speech involves two or more speakers or a speech coming from a moving speaker.

SUMMARY

In order to address the foregoing and other potential problems, the present invention proposes a method and system for speaker identification.

In one aspect, embodiments of the present invention provide a method of speaker identification for audio content being of a format based on multiple channels. The method comprises extracting, from a first audio clip in the format, a plurality of spatial acoustic features across the multiple channels and location information, the first audio clip containing voices from a speaker, and constructing a first model for the speaker based on the spatial acoustic features and the location information, the first model indicating a characteristic of the voices from the speaker. The method further comprises identifying whether the audio content contains voices from the speaker based on the first model. Embodiments in this regard further comprise a corresponding computer program product.

In another aspect, embodiments of the present invention provide a system of speaker identification for audio content being of a format based on multiple channels. The system comprises a first feature extraction unit configured to extract, from a first audio clip in the format, a plurality of spatial acoustic features across the multiple channels and location information, the first audio clip containing voices from a speaker, and a first model construction unit configured to construct a first model for the speaker based on the spatial acoustic features and the location information, the first model indicating a characteristic of the voices from the speaker. The system further comprises a first speaker identification unit configured to identify whether the audio content contains voices from the speaker based on the first model.

Through the following description, it would be appreciated that in accordance with embodiments of the present invention, spatial acoustic features are extracted across multiple channels from sample audio clip to better represent speakers and location information which is used to facilitate speaker model building, so that the speaker identification is applied to audio content of a format based on multiple channels and accuracy of the speaker identification is improved. Other advantages achieved by embodiments of the present invention will become apparent through the following descriptions.

DESCRIPTION OF DRAWINGS

Through the following detailed description with reference to the accompanying drawings, the above and other objectives, features and advantages of embodiments of the present invention will become more comprehensible. In the drawings, several embodiments of the present invention will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
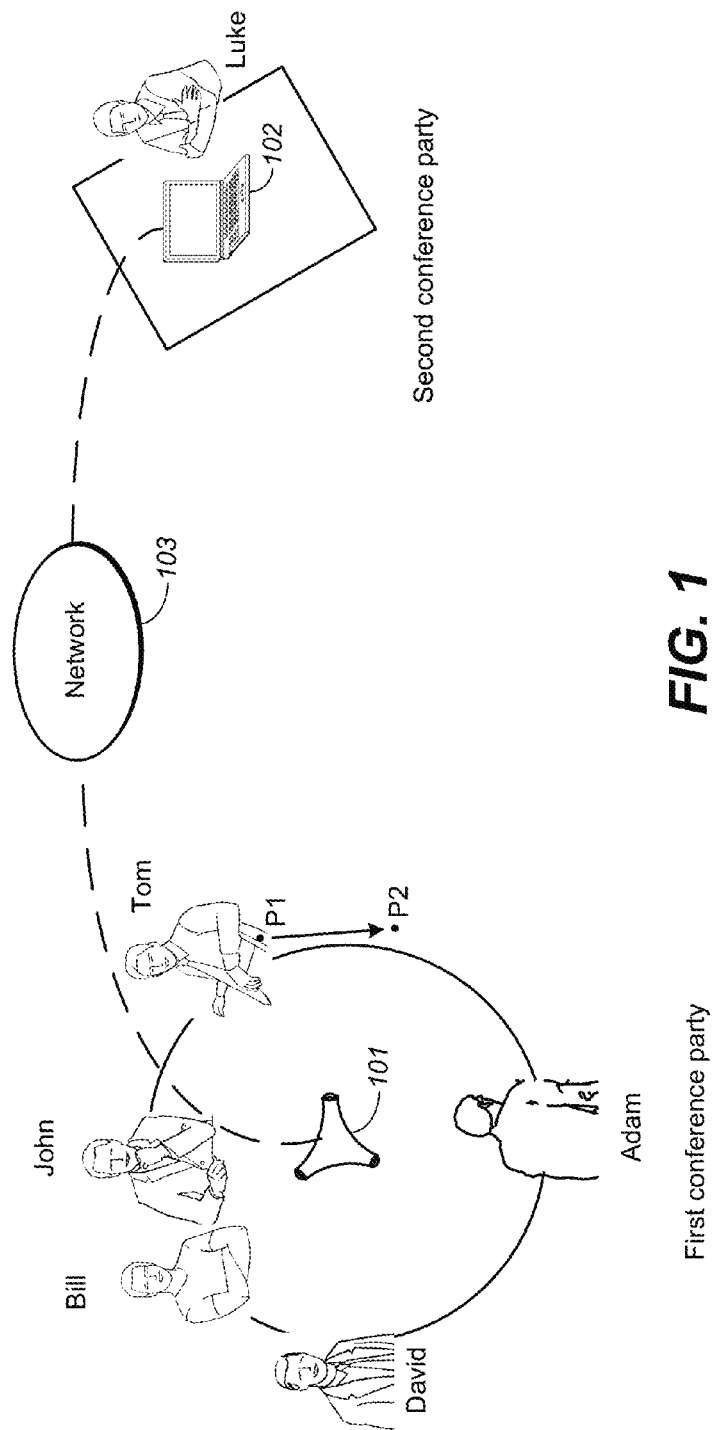
FIG. 1 illustrates a schematic diagram of an example environment in which embodiments of the present invention may be implemented.

Principles of the present invention will now be described with reference to various example embodiments illustrated in the drawings. It should be appreciated that depiction of these embodiments is only to enable those skilled in the art to better understand and further implement the present invention, not intended for limiting the scope of the present invention in any manner.

FIG. 1 illustrates a schematic diagram of an example environment in which embodiments of the present invention may be implemented.

In the environment as shown in FIG. 1, two parties are holding a conference. Multiple participants (for example, "Adam", "Tom", "John", "Bill", and "David" as shown) from the first conference party join the conference via the same endpoint device 101, while one or more participants (for example, "Luke" as shown) from the second conference party join the conference via another endpoint device 102. The endpoint devices 101 and 102 may record speech from the speakers and transmit the recorded speech to each other via the network 103. The endpoint devices 101 and 102 may also be able to play the received speech.

The endpoint device 101 may have multiple channels, and the endpoint device 102 may have a mono channel or multiple channels for example. The endpoint devices 101 and 102 may be any other types of devices having the capacity of audio recording, such as a conference phone, a headphone device, an earphone device, a mobile phone, a portable digital assistant (PDA), a mobile computer, a laptop, a tablet computer, a camera, a video camera, and other types of voice communication system.

In embodiments of the present invention, it is expected to be performed the speaker identification at the first conference party side. For example, at the same time of audio recording, the endpoint device 101 may identify who is participating in the conference and which participant(s) is/are currently talking. The identification results may be transmitted to the endpoint device 102 via the network 103 and may be displayed on the endpoint device 102 (or other display device at the second conference party side), so that the user (Luke) can recognize which participant from the first conference party is currently talking. It should be understood that the speaker identification may also be performed by other processing devices at the first conference party side or in the network 103, or even by the endpoint device 102 (or other devices) at the second conference party side.

It should be understood that the implementation environment in FIG. 1 is shown only for illustration purpose, without suggesting any limitation on the scope of the subject matter described herein. In some cases, more than two parties may join the conference. In some other cases, participants from one or more of the parties may have respective endpoint devices to talk to.

As mentioned in the foregoing description, the speaker identification in the existing solutions generally relate to monaural telephony systems and suffer less accurate results, a high computational burden, and robustness issues in a scenario where the audio to be identified is of a format based on multiple channels. In order to address these and other potential problems, embodiments of the present invention proposes a method and system for speaker identification for audio of a format based on multiple channels using spatial information in the audio. Embodiments of the present invention tend to provide unsupervised speaker identity (SPID) model building and real-time recognition based on the spatial information.

Figure 2:
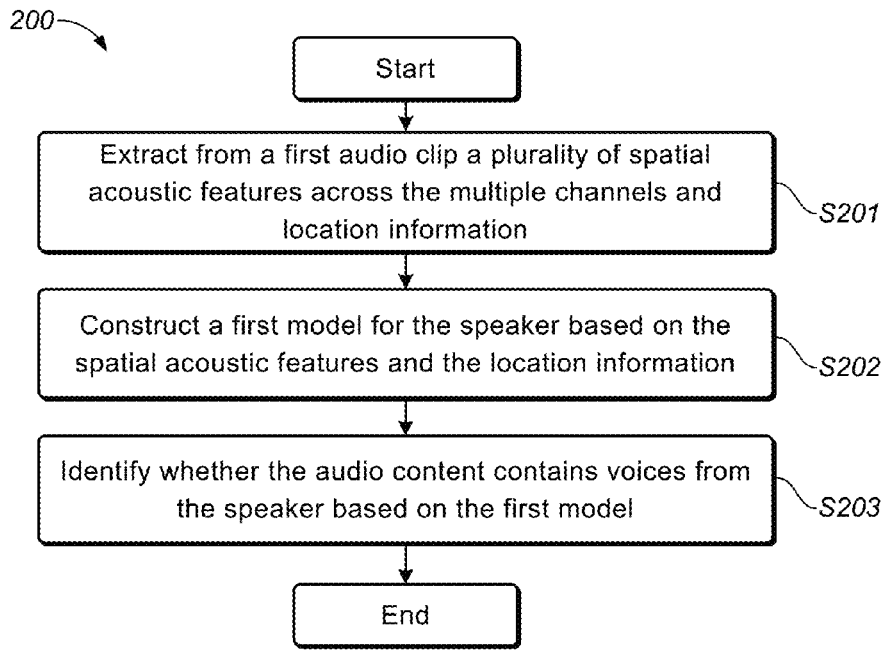
FIG. 2 illustrates a flowchart of a method of speaker identification for audio content in accordance with an example embodiment of the present invention.

Reference is now made to FIG. 2 which shows a flowchart of a method 200 of speaker identification for audio content in accordance with example embodiments of the present invention.

At step S201, a plurality of spatial acoustic features across multiple channels and location information are extracted from a first audio clip. The first audio clip has a format based on multiple channels and may contain voices from a speaker. The number of channels may be dependent on a device recording the audio clip.

In embodiments of the present invention, it is intended to perform the speaker identification on input audio content captured by the audio recording device with multiple channels in real time or previously. In order to perform speaker identification, speaker models should be built firstly based on some sample audios. To this end, an audio clip is selected from the input audio content and may be considered as sample audio used for building speaker models. In some embodiments, the first audio clip may be an audio signal captured by the endpoint device over a period of time from the start of an audio call. In some other embodiments, the first audio clip may include an audio signal captured by the endpoint device in a different audio call. The length of the first audio clip may be predetermined. Furthermore, the first audio clip or the input audio content may be filtered by voice activity detection (VOA) and the filtered frames associated with voices may be selected for processing.

Before extraction of acoustic features and location information, signal preprocessing may be applied to the first audio clip or the input audio content in order to facilitate subsequent speaker modeling and identification. Such example but not limiting signal preprocessing may include channel de-correlation, noise cancellation, automatic gain control (AGC), enhancement, and/or the like.

As mentioned above, embodiments of the present invention tend to provide speaker model building based on the spatial information. The spatial acoustic features and location information extracted from the first audio clip at this step can be considered as the spatial information.

The spatial acoustics feature used herein represents acoustics characteristics of the voice from a speaker. Spatial shifted delta cepstrum (SDC) features in the frequency domain may be utilized to represent the acoustics feature. Since the first audio clip has a format based on multiple channels, in order to better characterize the speaker, an acoustic feature across multiple channels (referred to herein as a spatial acoustic feature) can be extracted from the audio content. The spatial acoustic features may include an intra-channel SDC feature and an inter-channel SDC feature and may be extracted in a frequency domain in some embodiments. The detailed extraction process will be set forth below.

The location information indicates the spatial position of a speaker in the space, for example, in a meeting room. The location information of the speaker may include sound field analysis results which may include at least one of a direction of arrival (DOA) or a distance of the speaker with respect to the audio recording device. The sound field analysis may be referred to U.S. patent application publication US2014/0241528, entitled "Sound Field Analysis System", the disclosure of which is hereby incorporated herein by reference in its entirety. There may be many other ways to obtain the location information and the scope of the present invention is not limited in this regard. In one example, for each channel, each frame in the audio clip has the associated location information to indicate the spatial position from which the signal in the frame is captured.

Figure 3:
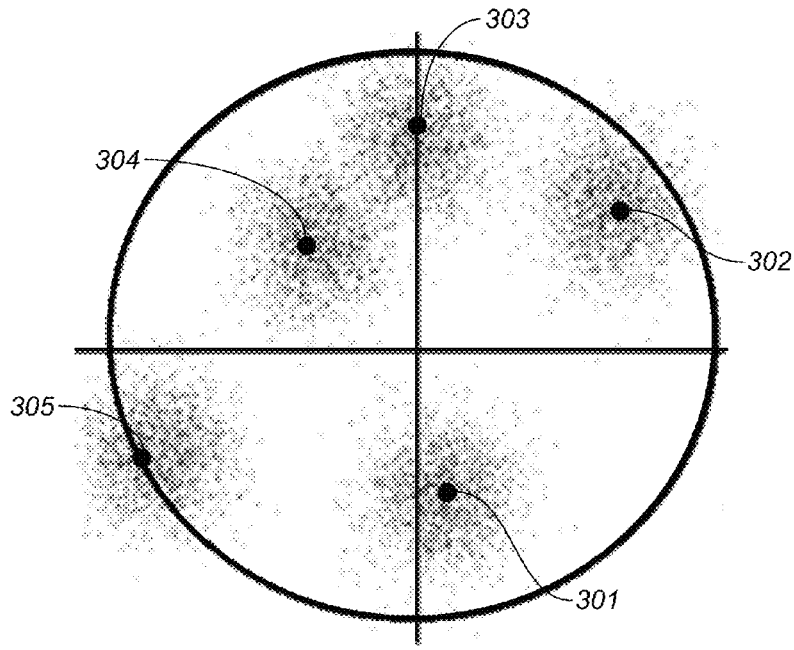
FIG. 3 illustrates a schematic diagram of distribution of location information in a polar system in accordance with some example embodiments of the present invention.

In some example embodiments, if assuming that speakers in the audio content have their own positions that are substantially fixed within a certain range of space and separated from each other by certain distances, by observing the location information from an enough amount of frames of audios, several clusters may be detected. FIG. 3 depicts a schematic diagram of distribution of location information in a polar system in accordance with some example embodiments of the present invention. As can be seen from FIG. 3, about five clusters, 301-305, are detected from the distribution, and each cluster may indicate presence of one speaker. For example, the cluster centroid may indicate a spatial position of a speaker and may be determined as $(\rho_i, \theta_i)$, where $\rho_i$ is a distance of the centroid of a cluster i (one of 301-305 shown in FIG. 3) and $\theta_i$ is an azimuth angle of the centroid. It should be noted that the location information may also be represented in any of other coordinate systems, for example, a 3 Cartesian coordinate, a cylindrical and spherical coordinate, and the like.

Note that with the DOA information or the distance information only, it is also possible to detect the presence of speakers. For example, the DOA information itself may indicate presence of a speaker in a certain direction. The distance information may indicate presence of a speaker away from the audio recording device by a certain distance.

The method 200 then proceeds to step S202, where a first model for the speaker is constructed based on the spatial acoustic features and the location information. The first model indicates a characteristic of the voices from the speaker.

This step relates to a model building process. The spatial acoustic features, which may represent a characteristic of a speaker, are used for building a model for the speaker. In example embodiments of the present invention, a support vector machine (SVM) algorithm may be used in the modeling process. The key of SVM is to determine its kernel function. Since the spatial acoustic features are extracted across multiple channels, which may result in a large number of dimensions in the features, it is desirable to provide the ability to handle large sequence data in the model building process as well as subsequent model based speaker identification. To this end, in some embodiments, a generalized linear discriminant sequence (GLDS) kernel function may be utilized due to the benefit of the linearization of the GLDS, which results in low memory consumption and low computational complexity. The GLDS kernel function may also be advantageous in parallel model building and composition, subsequent model refinement, etc. The first model determined based on the GLDS kernel function sometimes refers to a GLDS model.

As described above, clusters detected from the location information may indicate the positions of speakers roughly. Since it is expected to build one model for each speaker, the number of models built may be determined by considering how many clusters are detected from the location information. For example, since there are five clusters detected from the distribution of location information depicted in FIG. 3, if assuming that each cluster represents presence of a speaker, five models may be built for respective speakers. Furthermore, in order to better train the GLDS model corresponding a speaker, the spatial acoustic features associated with the speaker as well as the spatial acoustic features associated with other speakers may be used for model training. The location information may be used for determining which speaker the spatial acoustic features of an audio clip are associated with, for example, by comparing the location information associated with the audio clip and the spatial position of the speakers.

The method 200 further proceeds to step S203, where whether the audio content contains voices from the speaker is identified based on the first model.

It would be appreciated that after the models for the speaker is determined, speaker identification may be performed on the input audio content captured by the endpoint device used in the audio call. In embodiments where GLDS kernel is utilized in the modeling process, the speaker identification may be performed by an inner product between each first model and the spatial acoustic features extracted from the audio content. The result of the inner product may indicate which model the frame is closed to, and then the speaker corresponding to the model may be identified.

Figure 4:
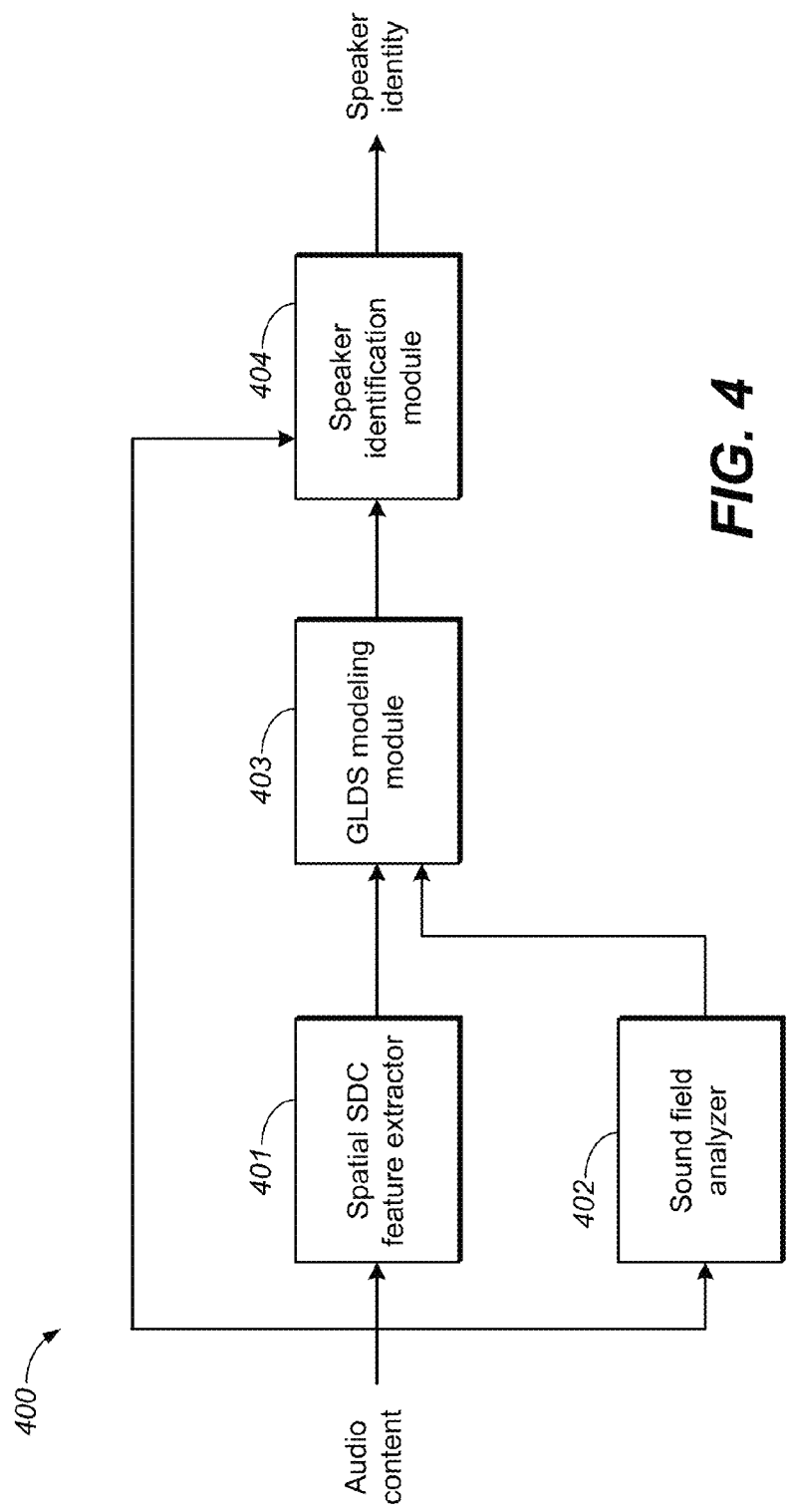
FIG. 4 shows a block diagram of a system 400 for speaker modeling and identification in accordance with some example embodiments of the present invention.

FIG. 4 shows a block diagram of a system 400 for speaker modeling and identification in accordance with some example embodiments of the present invention. The system 400 may be considered as a specific system implementation corresponding to the method 200 as describe above with reference to FIG. 2.

In the system 400, a spatial SDC feature extractor 401 and a sound field analyzer (SFA) 402 are responsible for the spatial information extraction from an audio clip that is of a format based on multiple channels. The audio clip may be a portion or all of the VAD filtered input audio content captured by an endpoint device. Specifically, the spatial SDC feature extractor 401 is configured to extract spatial SDC features across the multiple channels from the audio clip. The SFA 200 is configured to extract location information from the audio clip. The spatial SDC features and the location information are input to a GLDS modeling module 403 included in the system 400. The GLDS modeling module 403 is configured to construct a GDLS model for each speaker based on the spatial SDC features and the location information. The system 400 further includes a speaker identification module 404 configured to identify whether the audio content contains voices from the speaker based on the GLDS model constructed by the GLDS modeling module 403.

Figure 5:
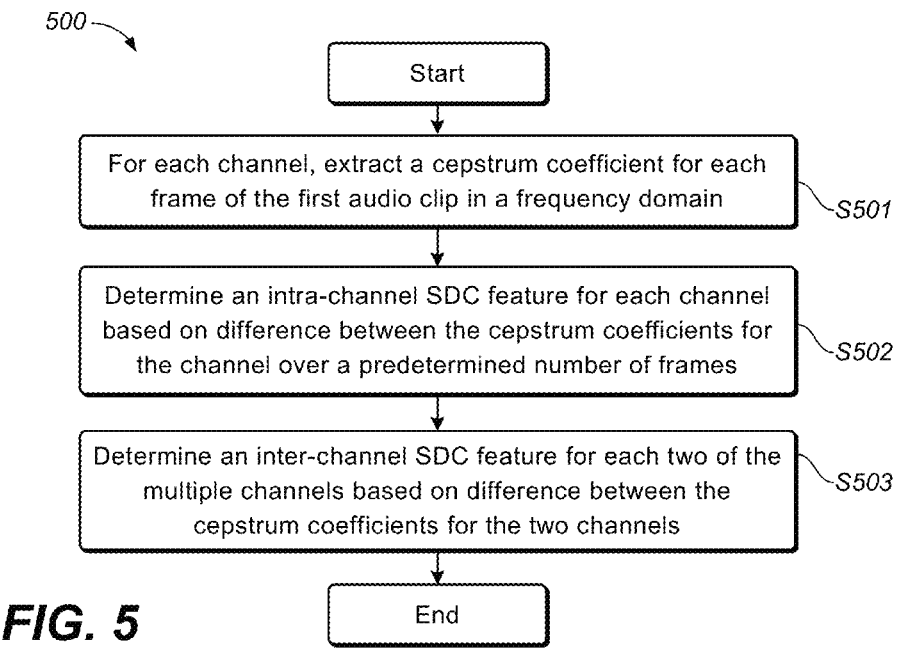
FIG. 5 illustrates a flowchart of a method for spatial shifted delta cepstrum (SDC) feature extraction in accordance with an example embodiment of the present invention.

Reference is now made to FIG. 5, which illustrates a flowchart of a method for spatial SDC feature extraction in accordance with an example embodiment of the present invention. The method 500 may be considered as a specific implementation of the method 200 as describe above with reference to FIG. 2.

At step S501, for each of the multiple channels, a cepstrum coefficient for each frame of the first audio clip in a frequency domain is extracted.

As mentioned above, the first audio clip is of a format based on multiple channels. When the first audio clip is of a time domain representation, the audio clip may be consisting of audio signals of the multiple channels. An audio signal for each channel may contain a plurality of samples. The audio signal may be preprocessed in time domain and then, in order to obtain the cepstrum coefficient, each frame may be converted into a frequency spectral representation.

In some embodiments where there are N samples of a channel j in the first audio clip, the preprocessing in the time domain comprises dividing the N samples of the channel j into M frames, each frame containing L samples, the processed audio signal of the channel j may be represented as below:

$$\begin{bmatrix} x_{1,j} \\ x_{2,j} \\ M \\ x_{N,j} \end{bmatrix} \Rightarrow S_j = \begin{bmatrix} x_{1,j} & x_{L+1,j} & L & x_{ML+1,j} \\ x_{2,j} & x_{L+2,j} & L & x_{ML+2,j} \\ M & M & L & M \\ x_{L,j} & x_{2L,j} & L & x_{(M+1)L,j} \end{bmatrix} \quad (1)$$

After the preprocessing, cepstrum coefficients for each frame in a channel may be extracted. In some embodiments, Mel-Frequency Cepstral Coefficients (MFCC) for each subframe of the frame across K nonlinear mel scale factor bands may be extracted as below:

$$C_j = dct(cep(fft(S_j))) = \begin{bmatrix} c_{1,1,j} & c_{1,2,j} & L & c_{1,M,j} \\ c_{2,1,j} & c_{2,2,j} & L & c_{2,M,j} \\ M & M & L & M \\ c_{K,1,j} & c_{K,2,j} & L & c_{K,M,j} \end{bmatrix} \quad (2)$$

where dct represents operation of Discrete Cosine Transform (DCT), cep represents cepstrum transform, and fft represents Fast Fourier Transform (FFT).

It should be noted that other cepstrum coefficients may also be extracted. For example, in some example embodiments, linear prediction cepstral coefficients (LPCC) for each subframe of a frame across multiple linear bands may be extracted.

A SDC feature, which is an extension of delta-cepstral coefficients, is then derived from the cepstrum coefficients extracted above. The SDC features of the first audio clip are calculated based on parameters K, d, P, and q. The parameter K represents the number of cepstrum coefficients in each frame. The parameter d represents a time span over which delta of the cepstrum coefficients can be calculated. The parameter P represents a gap between successive delta computations. The parameter q corresponds with the number of sampling points in a feature space, wherein the number of sampling points is q+1.

In the spatial SDC feature extraction, an intra-channel SDC feature and an inter-channel SDC feature for each frame of each channel should be determined from the extracted cepstrum coefficient. All intra-channel SDC features and inter-channel SDC features extracted from the first audio clip may be considered as a feature vector corresponding to the first audio clip.

At step S502 of the method 500, an intra-channel SDC feature for each channel is determined according to the difference between the cepstrum coefficients for the channel over a predetermined number of frames.

For example, for a given frame t of a channel j, difference between cepstrum coefficients for the channel j over a time interval 2d may be determined as:

$$\Delta c(t,l)_j = c_{t+lP-d,j} - c_{t+lP+d,j} \quad (3)$$

wherein the total count of l is q+1, wherein $c_{t+lP-d,j}$ represents the cepstrum coefficient for a frame at time t+lP-d in the channel j, and likewise $c_{t+lP+d,j}$ represents the cepstrum coefficient for a frame at time t+lP+d in the channel j.

On the basis of the calculation of $\Delta c(t,l)$, based on stacked version of q/2 folds with a step P in directions of both backward and forward to a time instant t, the intra-channel SDC feature for a frame at time t in a channel j may be by the following equation:

$$SDC(t)_j = \left[ \Delta c\left(t, -\frac{q}{2}\right)_j, \Delta c\left(t, -\frac{q}{2}+1\right)_j, \dots \Delta c\left(t, \frac{q}{2}\right)_j \right]^T \quad (4)$$

For each channel, a corresponding SDC feature may be obtained by the above equation (4).

At step S503 of the method 500, an inter-channel SDC feature for each two of the multiple channels is determined according to difference between the cepstrum coefficients for the two channels.

Since the first audio clip is of a format based on multiple channels, difference between cepstrum coefficients for different channels may be determined so as to better representing the characteristics of the speaker. For example, for a given frame t, difference between cepstrum coefficients for each two of the multiple channels, channel i and j, may be determined as:

$$\Delta c(t,l)_{i,j} = c_{t+lP-d,i} - c_{t+lP+d,j} \quad (5)$$

Then the inter-channel SDC feature for two channels i and j may be determined as:

$$SDC(t)_{i,j} = \left[ \Delta c\left(t, -\frac{q}{2}\right)_{i,j}, \Delta c\left(t, -\frac{q}{2}+1\right)_{i,j}, \dots \Delta c\left(t, \frac{q}{2}\right)_{i,j} \right]^T \quad (6)$$

$$1 \le i \le n, 1 \le j \le n, \text{ and } i \ne j$$

For each two of the multiple channels, a corresponding inter-channel $SDC_{i,j}$ feature may be obtained by averaging SDC(t)$_{i,j}$ across the time variable t, and dividing by the square root of that feature for normalization. For example, for an audio clip with three channels, there may be six obtained inter-channel SDC features, SDC$_{1,2}$, SDC$_{2,1}$, SDC$_{1,3}$, SDC$_{3,1}$, SDC$_{2,3}$, and SDC$_{3,2}$. Since inter-channel SDC features SDC$_{i,j}$ and SDC$_{j,i}$ may be substantially the same to each other, in some embodiments, one of SDC$_{i,j}$ and SDC$_{j,i}$ may be used for subsequent processing.

Figure 6:
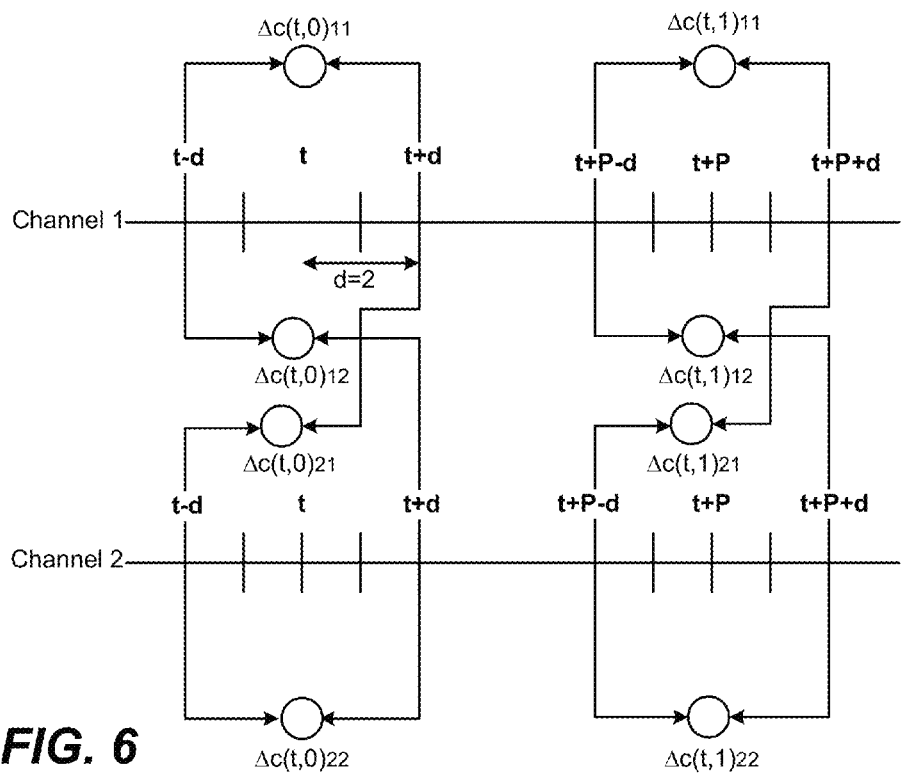
FIG. 6 illustrates a schematic diagram of intra-channel SDC feature and inter-channel SDC feature computation for two channels in accordance with some embodiments of the present invention.

FIG. 6 illustrates a schematic diagram of intra-channel SDC feature and inter-channel SDC feature computation for two channels in accordance with some embodiments of the present invention. Computations of the intra-channel SDC features and inter-channel SDC features for two channels are shown in FIG. 6 for an example. It should be understood that intra-channel SDC features and inter-channel SDC features for more channels may also be determined in a similar way shown in FIG. 6.

With the method 500, the spatial SDC features across the multiple channels of the first audio clip may be extracted. The spatial SDC features may be utilized with the location information for building models corresponding to speakers.

As discussed above, when the GLDS kernel is utilized, the GLDS modeling may be based on a SVM process. A SVM model may be constructed with a kernel function K(.,.) as below:

$$f(x) = \sum_{i=1}^{N} \alpha_i t_i K(x, x_i) + d \quad (7)$$

where $x_i$ represents a spatial acoustic feature, $\alpha_i$ represents a weighting factor, N represents the number of spatial acoustic features used for training the model and obtained from a training set by an optimization process d represents a shift value and $t_i$ represents a target value depending on whether the spatial acoustic feature $x_i$ is in a target class or not. If the spatial acoustic feature $x_i$ is in the target class, $t_i$ is +1. If the spatial acoustic feature $x_i$ is not in the target class, $t_i$ is −1. The equation (7) is constrained to $$\sum_{i=0}^{N} \alpha_i t_i = 0$$

and $\alpha_i > 0$.

The kernel function K(.,.) may be constrained to satisfy the Mercer condition, so that the kernel function may be represented as:

$$K(x,y) = b(x)^T b(y) \quad (8)$$

where b(x) or b(y) is a mapping function used for mapping the vector x or y from its dimensional space to a higher dimensional space respectively. Usually the mapping relates to polynomial expansion.

With the knowledge about the SVM modeling, since there are a large sequence of spatial acoustic features to be modeled, embodiments of the present invention intends to provide a GLDS based SVM model in order to take an advantage of the linearization as other advantages of the GLDS kernel function.

Figure 7:
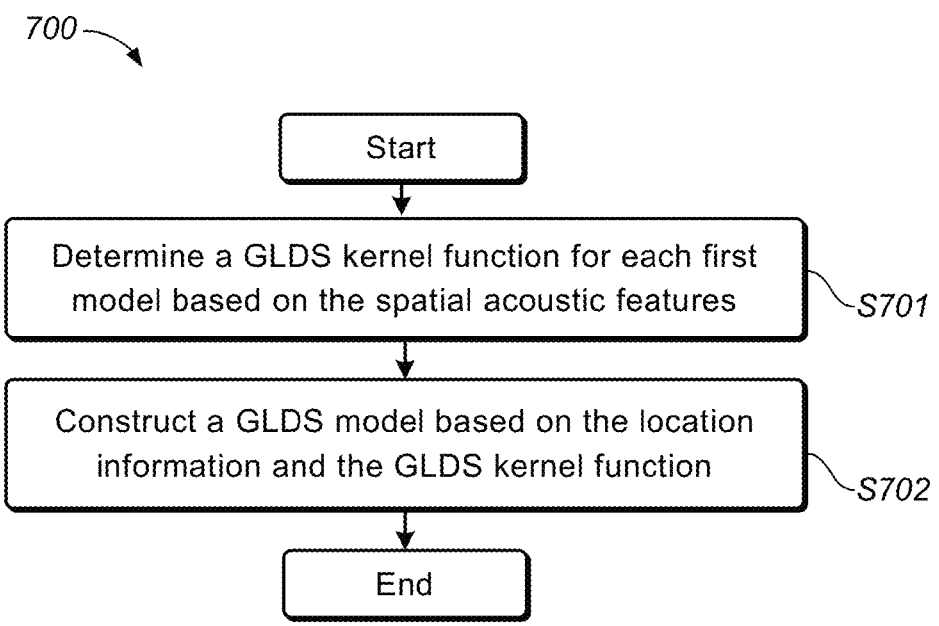
FIG. 7 illustrates a flowchart of a method for generalized linear discriminant sequence (GLDS) modeling in accordance with an example embodiment of the present invention.

FIG. 7 illustrates a flowchart of a method 700 for GLDS modeling in accordance with an example embodiment of the present invention. The method 700 may be considered as a specific implementation of the method 200 as describe above with reference to FIG. 2.

At step S701, a GLDS kernel function for the first model is determined based on the spatial acoustic features. A GLDS kernel function is a sequence kernel $K_{GLDS}(\{x_i\},\{y_i\})$ that can compare two sequences of spatial acoustic features, $\{x_i\}$ and $\{y_i\}$.

As described above, a kernel function is based on mapping a spatial acoustic feature vector from its dimensional space to another dimensional space, for example, to a higher dimensional space. To this end, a mapping function may be used for mapping the spatial acoustic feature vector in some embodiments. The mapping may be polynomial expansion, such as Cholesky expansion in an example. It should be noted that many other methods of mapping may also be applied, such as mapping based on a radial basis function (RBF), a Sigmoid function, or the like.

In some embodiments, a combination method is provided to determine the GLDS kernel function. In the combination method, the plurality of spatial acoustic features is first combined and then the dimensional mapping is performed on the combined spatial acoustic feature. The GLDS kernel function is determined based on the mapped spatial acoustic feature.

Figure 8:
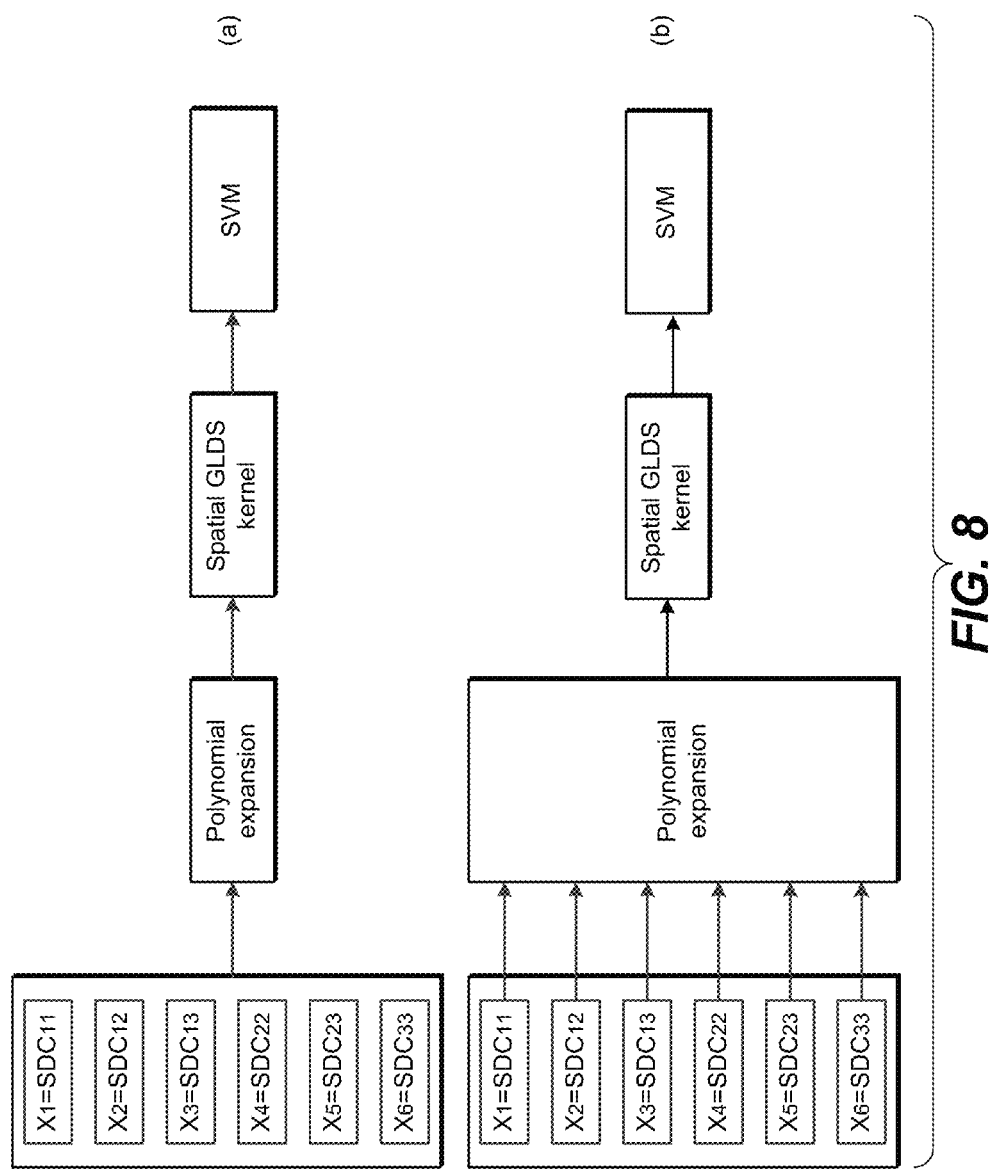
FIG. 8 illustrates a schematic diagram for processes of GLDS kernel function determination in accordance with an example embodiment of the present invention.

A process for the combination method of GLDS kernel function determination is given in FIG. 8 (a), where N sets of spatial acoustic features are first combined as one spatial acoustic feature vector and then the vector is expanded. The GLDS kernel function, as well as subsequent SVM modeling, is then based on the expanded vector. The polynomial expansion of these spatial acoustic features may be represented as:

$$b(X) = b(X_1, X_2, \ldots, X_N) \quad (9)$$

The number of dimensions of X is dependent on the number of dimensions of the combined spatial acoustic feature vector. For a vector with d dimensions, after taking a q order polynomial expansion (Cholesky expansion for example), usually the number of dimensions of the expanded vector N may be $C_{d+q}^q$. By simply combining the supports vectors to perform the dimensional mapping, it may produce, in an increased order, the resulting expanded vector with large dimensions, which may be time consuming in the model building process. In order to solve this problem, in some other embodiments, a cascade method is provided to determine the GLDS kernel function. In the cascade method, the dimensional mapping is performed on each spatial acoustic feature first. That is, the computations of mapping (for example, polynomial expansion) may be performed in parallel, which may save up the time cost. All of the mapped spatial acoustic features may then be combined as one mapped spatial acoustic feature and the GLDS kernel function may be determined based on the combined spatial acoustic feature.

A process for a combination method of GLDS kernel function determination is given in FIG. 8 (b), where each spatial acoustic feature vector $X_i$ is first expanded as $b(X_i)$. The expanded spatial acoustic feature vectors are combined to obtain one expanded spatial acoustic feature, based on which the corresponding GLDS kernel function is determined. The SVM is then performed based on the GLDS kernel function. The combination of expanded spatial acoustic feature vectors may therefore be written as below:

$$b(X) = [b(X_1) b(X_2) \ldots b(X_N)] \quad (10)$$

With both the combination and cascade methods, the resulting GLDS kernel function may be determined as:

$$K_{GLDS}(\{x_i\},\{y_i\}) = b_x^T R^{-1} b_y \quad (11)$$

where $R^{-1}$ is a correlation matrix derived from large background population and may be a diagonal matrix depending on the manner of polynomial expansion.

The value $K_{GLDS}$ ({$x_i$}, {$y_i$}) may be interpreted as scoring using a generalized linear discriminant on the sequence {$y_i$}, with a model trained from vector sequence {$x_i$}. The mapping between {$x_i$} and $b_x$ is defined as:

$$\{x_i\} \to \frac{1}{N_x} \sum_{i=1}^{N_x} b(x_i) \quad (12)$$

where $N_x$ is the number of spatial acoustic features in the sequence {$x_i$}.

At step S703, a GLDS model corresponding to the speaker is constructed based on the GLDS kernel function.

The first model determined based on the GLDS kernel function may then be represented as:

$$f(x) = \left( \sum_{i=1}^{N_x} \alpha_i t_i R^{-1} b(x_i) + d \right)^T b(x) \quad (13)$$

with $$w = \sum_{i=1}^{N_x} \alpha_i t_i R^{-1} b(x_i) + d \quad (14)$$

where $d = [d \ 0 \ ... \ 0]^T$.

w is the target model for a speaker. This model may be obtained by training across the spatial acoustic features. During training of a model, spatial acoustic features (for example, the spatial SDC features) associated with the speaker corresponding to the model to be trained (which is sometimes called a target class of features) may be used as well as spatial acoustic features associated with other speakers (which is sometimes called an impostor class of features). The spatial acoustic features in the impostor class may be obtained from the audio containing voices from various speakers and recorded by the endpoint device for other audio calls in some examples. The spatial acoustic features in the impostor class may also be obtained from an audio call currently taking place, for example, from audio within a certain period of time from the start of the audio call and containing voices from various speakers.

In the training process, w may be obtained under the minimum square error (MSE) rule and may be generated by:

$$w^* = \text{argmin}_w \left( \sum_{k=1}^{N_{pos}} |w^T b(x_k) - 1|^2 + \sum_{k=1}^{N_{neg}} |w^T b(y_k) + 1|^2 \right) \quad (15)$$

where $x_k$ represents a spatial acoustic feature in the target class of spatial acoustic features corresponding to the target speaker, and $N_{pos}$ represents the number of supports vectors in the target class. $y_k$ represents a spatial acoustic feature in the impostor class of spatial acoustic features corresponding to speaker(s) other than the target speaker, and $N_{neg}$ represents the number of supports vectors in the impostor class.

Figure 9:
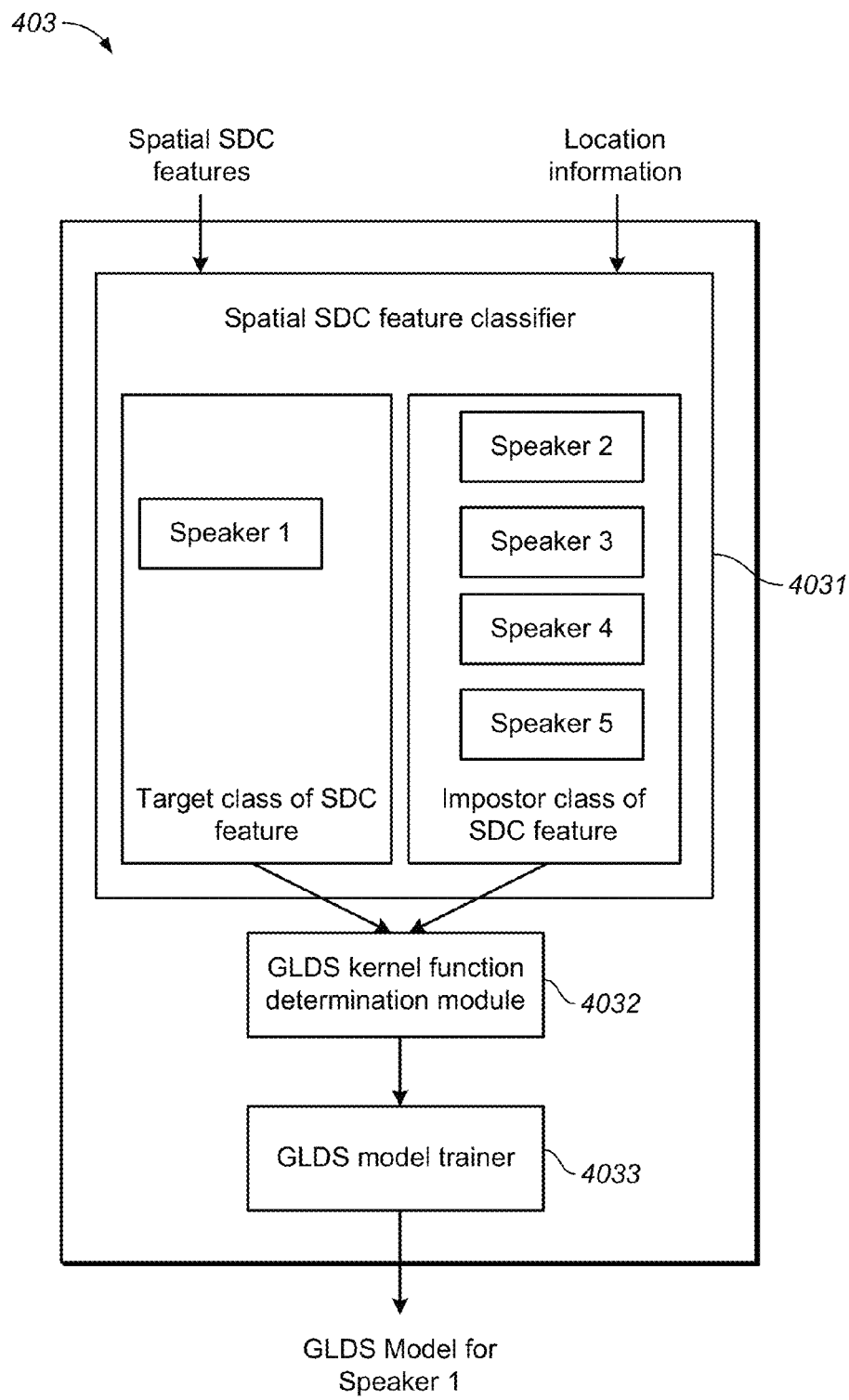
FIG. 9 illustrates a block diagram of a GLDS modeling module in the system for speaker modeling and identification in FIG. 4 in accordance with some example embodiments of the present invention.

FIG. 9 illustrates a block diagram of a GLDS modeling module 403 in the system for speaker modeling and identification in FIG. 4 in accordance with some example embodiments of the present invention. The GLDS modeling module 403 may be considered as a specific implementation of the system 400 as describe above with reference to FIG. 4.

The GLDS modeling module 403 includes a spatial SDC feature classifier 4031 that has input of spatial SDC features and location information. The spatial SDC feature classifier 4031 may be configured to classify, based on the location information, the input spatial SDC features into two classes, one being a target class corresponding to a target speaker, and the other being an impostor class corresponding to speakers other than the target one.

For example, in the example shown in FIG. 9, assuming that a model corresponding to Speaker 1 is now building and training by the GLDS modeling module 403. Based on the location information, the classifier 4031 in the GLDS modeling module 403 may decide to classify some of the input spatial SDC features corresponding to Speaker 1 into a target class of features and some other spatial SDC features corresponding to speakers other than Speaker 1, i.e., Speaker 2 to Speaker 5, into an impostor class of features.

The GLDS modeling module 403 also comprises a GLDS kernel function determination module 4032 configured to determine a GLDS kernel function for the target speaker based on spatial SDC features in the target class and the impostor class. A GLDS model trainer included in the GLDS modeling module 403 may then perform model training for a respective model corresponding to the target speaker based on the GLDS kernel function. Then a GLDS model for the target speaker may be determined. In example shown in FIG. 9, a GLDS model for Speaker 1 is output from the GLDS modeling module 403.

In the GLDS modeling module 403 shown in FIG. 9, a signaling direction in determining a model for Speaker 1 is shown as an example. It should be noted that the GLDS modeling module may also be used for determining models for other speakers with some changes in the signaling direction. The GLDS modeling may be processed in parallel in some embodiments. That is, there may be multiple GLDS modeling modules 403 in the system 400, each responsible for building a model for a respective speaker.

As can be seen from the process of GLDS modeling, the closeness between a model W and an input audio signal may be measured by an inner product between the model and the mapping function b ($y_t$) based on the spatial acoustic features $y_t$ extracted from the input audio signal, which may be represented as:

$$\text{Score}(y_t) = w^T b(y_t) \quad (16)$$

With the description above, the process of model building is described. It should be noted that, in some cases, the first audio clip used for modeling may include a plurality segments of audio and may contain voices from various speakers. In these cases, more than one model may be built for each of the speakers. That is, in addition to the first model built for a speaker described above, a second model may also be constructed from the first audio clip for a second speaker. In order to determine the number of speaker models to be built, in some embodiments, the location information (for example, the DOA information and the distance of the speakers) extracted from the audio clip may be used. As mentioned above, clusters detected from the location information may roughly indicate the presence of the speakers involved in the audio content. Based on the location information, the number of speaker models to be built for the potential speakers may be determined. For example, based on the location information shown in FIG. 3, five clusters are detected. If assuming that each cluster represents presence of a speaker, five models may be built for respective speakers. In case that two speakers are detected in one clusters or one speaker is detected into two clusters based on the location information, some existing and potentially simple speaker modeling methods (for example, existing monaural speaker modeling methods) may be used to provide more accurate classification in some embodiments. The process of model building for each of the speakers may be similar to what is described above.

Figure 10:
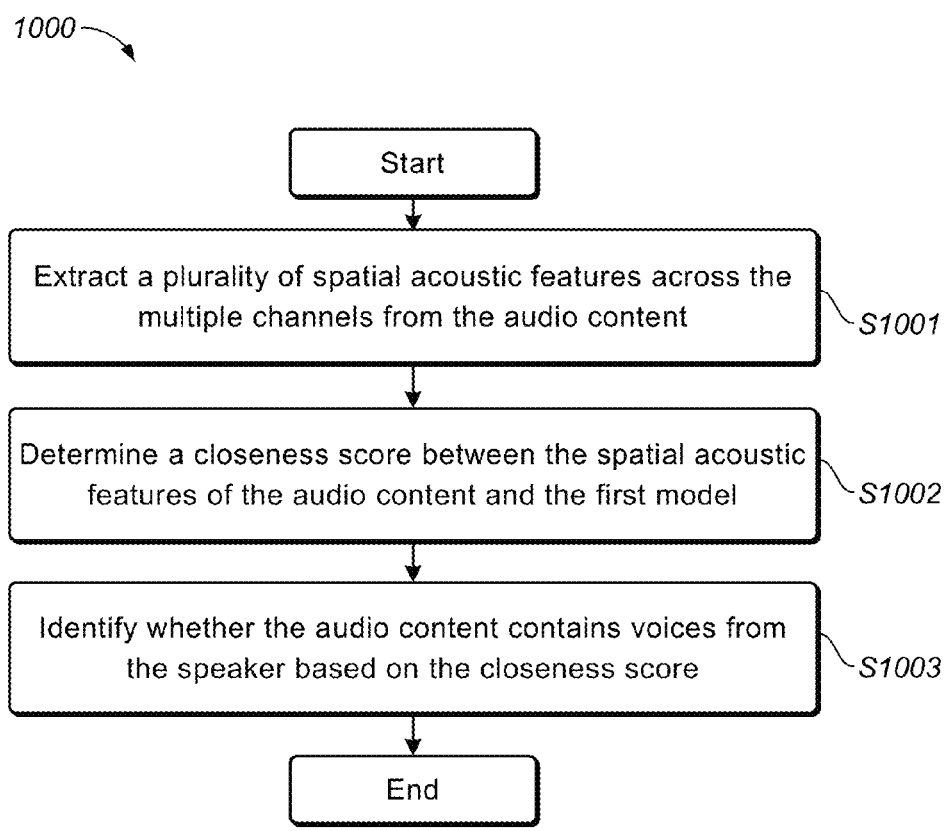
FIG. 10 illustrates a flow chart of a method for speaker identification on the basis of the construct model in accordance with some example embodiments of the present invention.

FIG. 10 illustrates a flow chart of a method 1000 for speaker identification on the basis of the construct model in accordance with some example embodiments of the present invention. The method 1000 may be considered as a specific implementation of the method 200 as describe above with reference to FIG. 2.

At step S1001, a plurality of spatial acoustic features across the multiple channels is extracted from the audio content. The description of spatial acoustic feature extraction has been described with reference to FIG. 5, which is omitted here for the sake of clarity.

At step S1002, a closeness score between the spatial acoustic features of the audio content and the constructed model is determined. After the modeling process, there may be one or more models (GLDS models in case of GLDS kernel functions) corresponding to respective speakers determined. The closeness between the audio content and a certain model may be measured by scoring the certain model. The equation (16) may be utilized.

The method then proceeds to step S1003, identify whether the audio content contains voices from a speaker based on the closeness score. In some embodiments, the model with the highest closeness score may be determined, and then the speaker corresponding to this model may be identified. In some other embodiments, the model with a score higher than a predefined threshold may be determined. The scope of the present invention is not limited in this regard.

Note that since only an inner product is needed to determine the score of the model, speaker identification has low computational complexity.

After the speaker whose voices contain in the audio content is identified, an identifier of the speaker may be provided for users that expect the identification results, for example, for participants of the other conference party who expect to know who is currently talking in the audio content. For example, in the scenario shown in FIG. 1, after identifying which of the five participants from the first conference party is currently talking from the audio content captured by the endpoint device 101, the result may be transmitted to the device 102 at the second conference party side. The result may be displayed on the device 102. In some embodiments, the location information of the speakers may also be sent to the device 102. In accordance with the location information, the device 102 may picture distribution of participants from the first conference party in a space, for example, in a meeting room. The identifiers of participants may be displayed with respect to the distribution in a display region, and an identifier of the speaker who is currently talking may be highlighted, which can improve the user experience. It is noted that the speaker identification result can be displayed in many other ways, for example, in a way of list with the identifier of the currently identified speaker highlighted by color, font, an icon, or the like.

Figure 11:
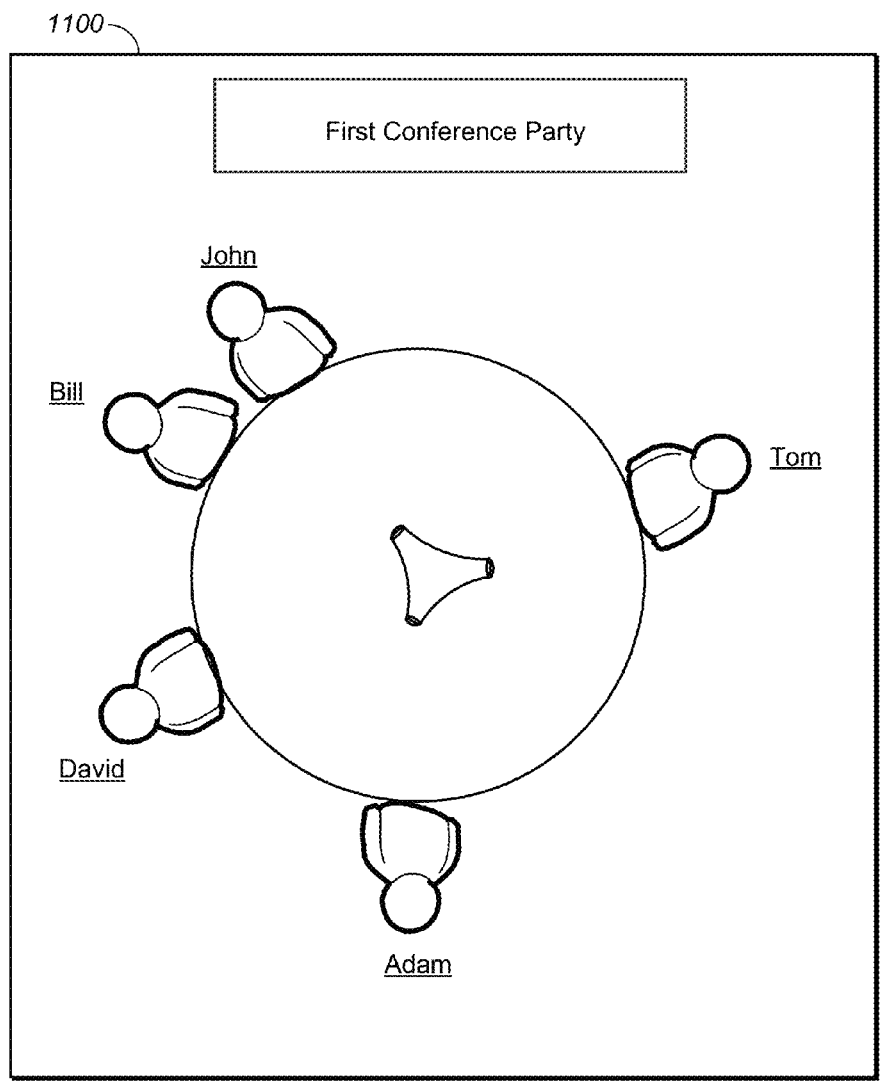
FIG. 11 illustrates a graphical user interface (GUI) displaying a result of the speaker identification in accordance with some example embodiments of the present invention.

FIG. 11 depicts a graphical user interface (GUI) 1100 displaying a result of the speaker identification in accordance with some example embodiments of the present invention. The GUI 1100 may be a display interface of the device 102 in the scenario shown in FIG. 1. By receiving location information from the device 101, the device 102 may detect that participants from the first conference party are sitting as a circle and may also determine their positions relative to each other, as shown in FIG. 11. The identification result sent from the device 101 indicates that "Adam" from the first conference party is currently talking and then the device 102 may highlight the name of "Adam" in the GUI 1100.

The identifiers of speakers may be obtained by various methods. For example, speech analysis may be performed on the audio content to retrieve identifiers (e.g., names) of the speakers. In another example, a mapping list of the identifiers and the speaker models may be configured, for example, by user input. In yet another example, different identifiers may be automatically assigned for respective models so as to distinguish speakers corresponding to the models from one another.

In speaker modeling described above, a sample audio clip (generally audio within a period of time captured by the audio recording device) is used to build and train the speaker models. Due to the limit of amount of the sample audio, the built models may not be accurate enough. Moreover, since the conditions of participating speakers may changes, for example, the number of speakers may change (e.g., one or more speakers may leave and one or more new speaker may enter into the conference) or positions of the speakers may change, the speaker models may be refined and updated. In some embodiments, the determined first model may be updated according to a second audio clip of the format based on the multiple channels. In embodiments where GLDS speaker models are built, the refinement may be updated by linear combination of spatial acoustic features of the second audio clip with an existing model. The second audio clip may be a new portion of audio recording that is different from the first audio clip (the sample audio clip) in some examples. The refinement of the speaker models may be periodically performed. For example, every other one minute, the refinement is performed. The time period for refinement of each speaker model may be the same in some embodiments. In some other embodiments, different speaker models may be configured with respective time periods for refinement. There may be other events that trigger the refinement, such as a user input event or an error criterion event.

In some embodiments, the second audio clip may be used to just update a certain speaker model corresponding to a speaker who produces the speech in the second audio clip. This method may be called a hard refinement method. In the hard refinement method, a plurality of spatial acoustic features across the multiple channels may be extracted from the second audio clip, and determination may be made regarding which speaker is associated with the second audio clip. The extraction of spatial acoustic features may be similar to what is described with reference to FIG. 5, which is omitted here for the sake of clarity. The determination of association between the second audio clip and a speaker may be based on location information. For example, location information may be extracted from the second audio clip and may be compared with a position of a speaker corresponding to a certain speaker model. The spatial acoustic features of the second audio clip may then be added to a first model corresponding to the determined speaker according to a predetermined weight.

In one example, assuming that the second audio clip is determined to be used for updating a speaker model of a speaker j in a $l^{th}$ round, the closeness scoring equation (16) may be updated corresponding and may be represented as:

$$\text{Score}_j^l(y_t) = [\mu m_j^l w_j^T + \mu b(y_j)] b(y_t), \quad (17)$$

with $$\mu = \frac{1}{m_j^l + 1}, \quad (18)$$

where $\mu m_j^l w_j^T + \mu b(y_j)$ represents the updated model of the speaker j in the $l^{th}$ round, $y_j$ is a spatial acoustic feature sequence of the speaker j, and $\mu$ is a weight of the spatial acoustic features of the speaker j in the $l^{th}$ round and may be determined by the equation (18). The value of $m_j^l$ may be predetermined.

As can be seen from the above description, an existing speaker model may be iteratively updated until sufficient rounds of refinement have been performed, and then the model may tend to be converged and stable. In this case, the weight of the second audio clip may be decreased based on the number of rounds that has been performed, and the model may substantially remain unchanged. For example, the value of $m_j^l$ in $(l+1)^{th}$ round may be determined as:

$$m_j^{l+1} = m_j^l + 1. \quad (19)$$

Due to the increase of $m_j^l$, the weight $\mu$ of the spatial acoustic features of the speaker j in the $(l+1)^{th}$ round may be decreased. It should be note that that one example way of decreasing the weight is shown in the equation (19), and the weight may be decreased by any other value in other examples.

In some embodiments, the second audio clip may be used to update each of the existing speaker models based on respective weight. That is, the second audio clip may be softly assigned to update the speaker models. This method may be called a soft refinement method. In the soft refinement method, spatial acoustic features across the multiple channels may be extracted from the second audio clip and a weight for each first model may be determined based on the spatial acoustic features of the second audio clip. Then the spatial acoustic features of the second audio clip may be added to a respective first model according to the determined weight.

In one example embodiment, the weight of the second audio clip for a speaker model may be determined based on the closeness score between the spatial acoustic features of the second audio clip and the speaker model. For example, the weight of an audio clip i for a speaker model $w_j$ may be determined by a ratio of the closeness score for the speaker model $w_j$ to a total closeness score for all existing speaker models, which may be represented as:

$$P(j | y_i) = \frac{\text{Score}_j(y_i)}{\sum_{j}^{N} \text{Score}_j(y_i)} \quad (20)$$

The closeness scoring model of a speaker j in all speakers may be represented as:

$$\text{Score}_j^l(y_t) = [\mu m_j^l w_j^T + \mu P(j | y_i) b(y_i)] b(y_t), \quad (21)$$

with $$\mu = \frac{1}{m_j^l + P(j | y_i)}, \quad (22)$$

and $$m_j^{l+1} = m_j^l + P(j | y_i). \quad (23)$$

where $\mu m_j^l w_j^T + \mu P(j|y_i) b(y_i)$ represents the updated model of the speaker j in the $l^{th}$ round, $y_i$ is a spatial acoustic feature vector of a new audio clip used for updating, and $\mu$ is a weight for updating the model of speaker j in the $l^{th}$ round based on the spatial acoustic feature vector $y_i$ and may be determined by the equation (22). The value of $m_j^l$ may be predetermined. In this case, each of the existing speaker models is updated by a respective weight.

In the embodiments where the weight for each speaker is based on the closeness score, when a new coming audio clip does not belong to any existing speaker model, the closeness scores calculated for all existing speaker model may be approximately equal and there may not be a dominant score. However, according to the above refinement method, the new audio clip may still be used for updating the existing speaker models evenly. That is, with the refinement method above, a new speaker model may not be built for a new coming speaker even using a sufficient amount of audio content to refine or retrain the existing speaker models.

For a better speaker model updating, in another example embodiment, the weight for each speaker model is provided based on using an Estimation-Maximization (EM) process to determine a probability of the second audio clip coming from each of the speakers. In the EM process, Gaussian Mixture Modeling (GMM) may be introduced. A GMM model (a third model) may be constructed for a speaker. The probability of the second audio clip containing voices from a speaker may then be determined by the closeness between the second audio clip and each GMM model corresponding to the speaker. The EM process can provide an iterative way to find the probability.

It is known that the EM process is sensitive to initial conditions. Therefore, in an embodiment, the GMM model may be constructed based on the spatial information of the speakers, e.g., DOA and distance information. As described above, clusters detected from the location information may roughly indicate the presence of speakers involved in the audio content. Based on the DOA and distance information, the number of GMM models for the speakers and the GMM parameters (for example, means and variance) may be determined when built. For example, a GMM model corresponding to a speaker cluster j may be built by:

$$N(x | \mu_j, \sigma_j) = \frac{1}{(2\pi)^{\frac{d}{2}} \sqrt{|\sigma_j|}} \exp\left(-\frac{1}{2}(x - \mu_j)^T \sigma_j^{-1}(x - \mu_j)\right) \quad (24)$$

The GMM models are maybe not exactly identical to the GLDS models, which are multi-dimensional clusters in a hyper plane giving out a closeness probability by computation of scores using a GLDS kernel. To achieve iterative refinement from a two-dimensional polar system to the multi-dimensional GLDS sequence kernel in hyper plane, a probabilistic composite learning may be used as an intermediate bridge. In some embodiments, a probability of the second audio clip coming from a speaker corresponding to each GMM model may be determined based on the spatial acoustic features of the second audio clip in an EM iterative process. Then the weight for each first model may be based on the probability.

The objective of the EM process is to find a hidden variable by maximizing the likelihood p(X|θ) of given data sequence X drawn from unknown distributions, given the model parameterized by θ, which may be determined by the following:

$$\theta^* = \operatorname{argmax} p(X \mid \theta) = \operatorname{argmax} \prod_{i=1}^{n} P(X_i \mid \theta) \quad (25)$$

With the concept of the EM process above, in the embodiments of the present invention, it is intended to determine in the EM process a GMM model that has the maximized probability of the second audio clip coming from the speaker characterized by this GMM model.

An example of the EM process is described below.

E Step:

In the discussion in embodiments of the present invention, the hidden variable in the EM process is the actual speaker to which the second audio clip belongs. In the estimation step, assuming that the hidden variable is available by observing the comparison result of GMM models with a two-dimensional parameter of means and variances $(\mu, \sigma)$. Therefore, in the E step, a probability $P(j|x_i, \theta^s)$ of the spatial acoustic feature of the second audio clip belonging to a GMM model j may be determined as by the posterior probability $P(x_i|j, \theta^s)$, which may be represented as:

$$E[q_{i,j} \mid X, \theta^s] = 1 * P(q_{i,j} = 1 \mid X, \theta^s) + 0 * P(q_{i,j} = 0 \mid X, \theta^s) \quad (26)$$

$$= P(j \mid x_i, \theta^s) = \frac{P(x_i \mid j, \theta^s) P(j \mid \theta^s)}{P(x_i \mid \theta^s)}$$

where s represents the sth round of the EM iteration, and $q_{i,j}$ is determined by the following:

$$q_{i,j} = \begin{cases} 1, & \text{if an audio sample } i \text{ is closed} \\ & \text{to a GMM model } j; \\ 0, & \text{otherwise.} \end{cases} \quad (27)$$

M Step:

In the first round, each of the existing first models (the GLDS models) may be updated by the second audio clip with the probability obtained in the E step. For example, a spatial acoustic feature vector $x_i$ of the second audio clip may be used to update a GLDS model j by the probability $P(j|x_i, \theta^s)$.

In subsequent rounds of the EM process, after the posterior probabilities of each sample have been obtained for each GMM model, the probability $P(j|x_i, \theta^s)$ can be refined by introducing the score resulting from a GLDS model which may be represented as:

$$P(j|x_i, \theta^s) = \alpha P(j|x_i, \theta^s) + (1-\alpha)\text{Score}_j(y_i) \quad (28)$$

The M step is used to determine a parameter θ that maximizes the auxiliary function A by $$\frac{\partial A}{\partial \theta} = 0$$

for the mean $\mu_j$ and the variance $\sigma_j$ of the GMM model, or an importance weight $w_j$ of a speaker j.

In the M step for the mean $\mu_j$, the determination process may be represented as the following, where n represents the number of features extracted from the second audio clip:

$$\frac{\partial A}{\partial \mu_j} = \sum_{i=1}^{n} \frac{\partial A}{\partial \log p(x_i \mid j, \theta)} \frac{\partial \log p(x_i \mid j, \theta)}{\partial \mu_j} \quad (29)$$

$$= \sum_{i=1}^{n} \frac{\partial A}{\partial \log p(x_i \mid j, \theta)} \frac{\partial \log p(x_i \mid j, \theta)}{\partial \mu_j}$$

$$\sum_{i=1}^{N} P(j \mid x_i, \theta^s) * \frac{(x_i - \mu_j)}{\sigma_j^2} = 0 \quad (30)$$

$$\hat{\mu}_j = \frac{\sum_{i=1}^{n} P(j \mid x_i, \theta^s) * x_i}{\sum_{i=1}^{n} P(j \mid x_i, \theta^s)} \quad (31)$$

In the M step for the variance $\sigma_j$, the determination process may be represented as:

$$\frac{\partial A}{\partial \sigma_j^2} = \sum_{i=1}^{n} \frac{\partial A}{\partial \log p(x_i \mid j, \theta)} \frac{\partial \log p(x_i \mid j, \theta)}{\partial \sigma_j^2} \quad (32)$$

$$= \sum_{i=1}^{n} P(j \mid x_i, \theta^s) \left( \frac{(x_i - \mu_j)^2}{2\sigma_j^4} - \frac{1}{2\sigma_j^2} \right) = 0$$

$$\hat{\sigma}_j^2 = \frac{\sum_{i=1}^{n} P(j \mid x_i, \theta^s) * (x_i - \mu_j)^2}{\sum_{i=1}^{n} P(j \mid x_i, \theta^s)} \quad (33)$$

In some implementations of the speaker identification, after one speaker is identified from the audio content, some audio processing may be applied to the audio content. For example, in a multi-party conference, in some cases one or more of the participating speakers may have dominant times in talking than the others, especially in some broadcast scenarios. Therefore, in some embodiments, a weight parameter $w_j$ for a speaker j that indicates the importance of the speaker may be obtained in the E step, and $$\sum_{j=1}^{N} w_j = 1$$

where N is the number of existing speaker models. This importance weight parameter may be used for subsequent processing regarding this speaker.

In the M step for the weight parameter $w_j$, the auxiliary function used for $w_j$ may be written as:

$$J(\theta, \theta_s) = A(\theta, \theta_s) + \left(1 - \sum_{j=1}^{N} w_j\right)\lambda_j \qquad (34)$$

where $\lambda_j$ is the Lagrange multipliers.

The determination process of the weight parameter $w_j$ may be represented as:

$$\frac{\partial A}{\partial w_j} = \sum_{i=1}^{n} \frac{\partial J}{\partial A(\theta, \theta_s)} \frac{\partial A(\theta, \theta_s)}{\partial w_j} - \lambda_j \qquad (35)$$

$$\hat{w}_j = \frac{\sum_{i=1}^{n} P(j \mid x_i, \theta^s)}{\lambda_j} = \frac{\sum_{i=1}^{n} P(j \mid x_i, \theta^s)}{\sum_{k=1}^{N} \sum_{i=1}^{n} P(k \mid x_i, \theta^s)} = \frac{1}{n}\sum_{i=1}^{n} P(j \mid x_i, \theta^s) \qquad (36)$$

After the M step in each round of iteration, the obtained parameters, the mean and the variance $\sigma_j$, may be used to refine the GMM model. Based on the updated GMM model, the probability $P(j|x_i, \theta^s)$ in the E step may be updated in the next round of iteration, as well as $P(x_i|j, \theta^s)$. In some embodiments, with the updated probability $P(j|x_i, \theta^s)$, the closeness scoring model $Score_j(x_i)$ based on the GLDS model may be updated according to the equation (28), and then the GLDS model is updated. The EM process may be iteratively performed until a certain level of convergence is achieved.

Figure 12:
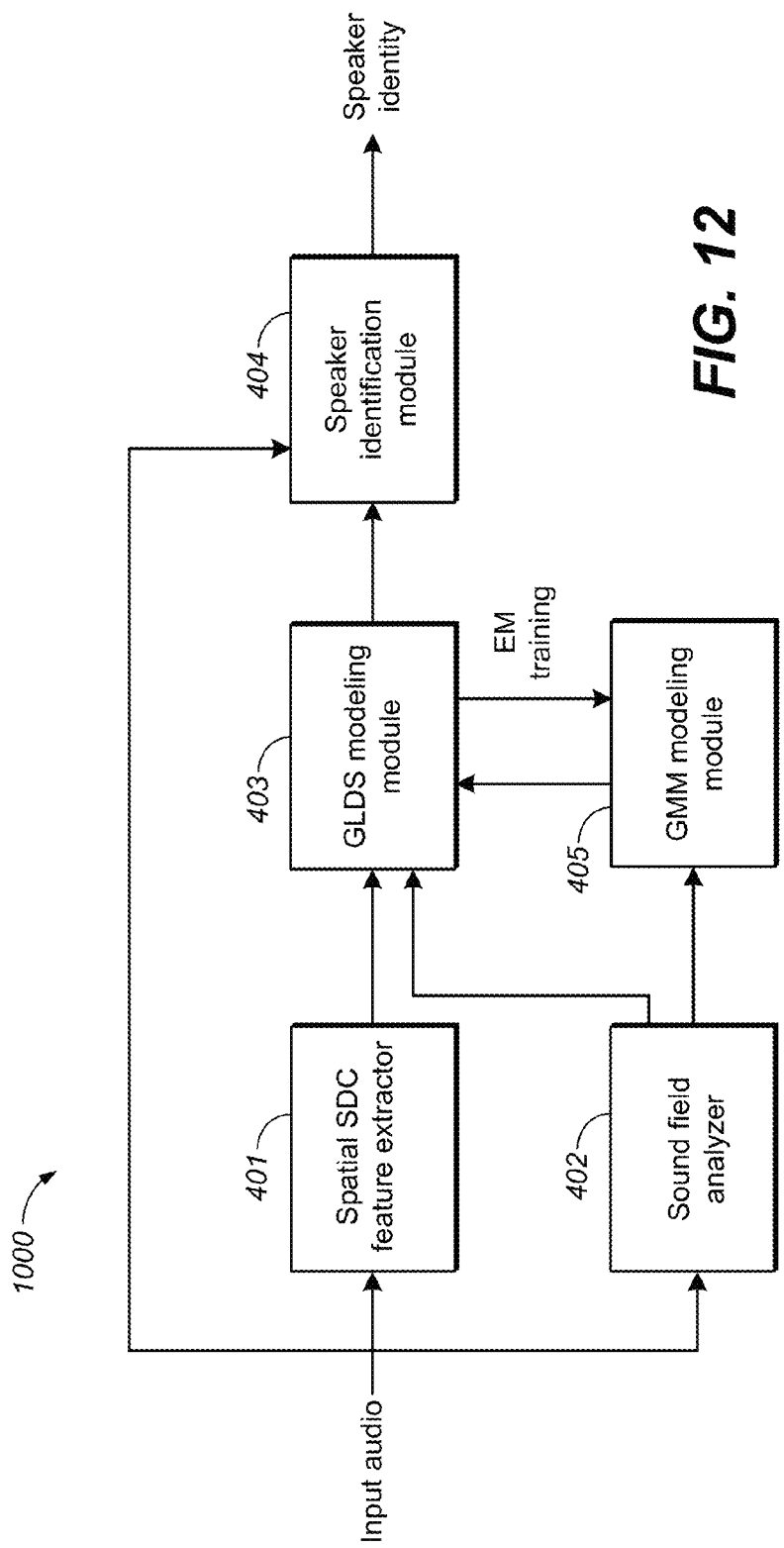
FIG. 12 illustrates a block diagram of a system for speaker modeling and identification in accordance with another example embodiment of the present invention.

FIG. 12 illustrates a block diagram of a system 1200 for speaker modeling and identification in accordance with another example embodiment of the present invention. In view of the model refinement based on the GMM model, compared with the system 400 shown in FIG. 4, an additional module, a GMM modeling module 405, is added. The GMM modeling module 405 may be configured to perform GDLS model refinement by the EM iterative process as described above.

In the above description, the speaker models (including the GLDS models and the GMM models) are built based on the assumption that the clusters detected from the location information corresponding to positions of respective speakers. However, in some conditions, a speaker may change his position. Under this condition, there may be two or more models built for the speaker based on the location information. For example, in the scenario shown in FIG. 1, Speaker "Tom" may change his position from P1 to P2 in a conference and may have speech captured by the device 101 in both positions, and then two models may be built for "Tom" based on the location information captured by the endpoint device 101.

In order to maintain a unique model for a respective speaker, in some embodiments, redundant models of a speaker may be merged in the model refinement process. In the conditions where redundant models of a speaker exist, spatial acoustic features extracted from an audio sample of the speaker may be closed to all of the redundant models. In this sense, a closeness score between the spatial acoustic features of the second audio clip (the audio sample used to update the existing models) and each first model (i.e., the GLDS model) may be first determined in some embodiments, so as to measure the closeness degree of the audio sample to the existing model. In some other embodiments, the probability of the second audio clip coming from each GMM model may also be determined and used to measure the closeness degree.

By observing the closeness score, in some embodiments, if the closeness scores of at least two first models are higher than a first threshold, the at least two GLDS models may be merged and the at least two GMM models may also be merged, for example, by linear combination. The first threshold may be configured.

For example, if the closeness scores determined for GLDS models from $j_m$ to $j_n$ are higher than the threshold, the new merged GLDS model may be obtained by linear combination of the GLDS models from $j_m$ to $j_n$. For example, the new merged GLDS model may be represented by the following:

$$\text{Score}_{j_{new}}(y_t) = \sum_{j=j_m}^{j_n} \mu m_j w_j^T b(y_t); \qquad (37)$$

with $$\mu = \frac{1}{\sum_{j=j_m}^{j_n} m_j} \qquad (38)$$

By observing the closeness score, in some embodiments, if the closeness scores of at least two GLDS models are higher than the first threshold, at least two GMM models of the speakers corresponding to the at least two GMM models may also be merged. The correspondence of the GLDS models and the GMM models may be built by the corresponding speaker.

Different from the linear combination of the GLDS models, the new merged GMM model based on the GMM models from $j_m$ to $j_n$ may be represented by the following:

$$N(x \mid u_{j_{new}}, \sigma_{j_{new}}) = \bigcup_{j=j_m}^{j_n} N(x \mid u_j, \sigma_j) \qquad (39)$$

In some cases, two or more speakers may be positioned in proximity to each other and their speeches may be overlapped. Due to the proximity in positions, in both the GLDS model building and GMM model building process, the same GLDS model (or a GMM model in case of GMM modeling) may be assigned to these speakers based on the location information. As a result, the model may not be able to well represent any of these speakers, and thus audio samples come from these speakers may not exhibit a dominant closeness to the model. In some other cases, when a new speaker joins the audio call and no model has been built for the new speaker, the closeness score between an audio sample of this speaker and each of existing GLDS models or the probability of the audio sample coming from each of existing GMM models may be equal to one another. Therefore, if the closeness score of each first model is observed to be lower than a second threshold (the value of which may be configured), a new GLDS model may be built in order to represent the new speaker in some embodiments. Also, a new GMM model may also be built. In one example, to obtain a new GMM model, the cluster corresponding to the existing GMM model may be split into two or more clusters with different cluster centers and then two or more new GMM models may be built. In an embodiment, in the model refinement using the EM process as described above, when the closeness score of each model is observed to be low in one round of iteration, the posterior probability of the sample audio may be proportionally split for each of the two new GMM models based on the distance (the Euclidean distance in one example) of the new cluster centers to the center of the original cluster.

It should be noted that for better model refinement, model merging or split described above may be performed based on the observation of the incoming audio samples over a period of time.

In embodiments of the present invention, speaker modeling and identification is described. After speaker models has been built and trained to a converged level, the models may be stored in a database for further identification. In use cases of teleconference, models built in previous conferences may be stored and when a new conference starts, the built models may be directly utilized to perform speaker identification and audio samples captured in the new conference may be used to refine the existing models. In other embodiments, at start of each teleconference, new models may be built based on audio samples captured in this conference.

According to speaker modeling and identification provided in the embodiments of the present invention, spatial acoustic features are extracted across multiple channels from sample audio clip to better represent speakers and location information is used to facilitate speaker model building, so that the speaker identification is applied to audio content of the format based on multiple channels and accuracy of the speaker identification is improved. Furthermore, since the GLDS kernel function is used for model building and refinement, computational complexity is reduced and advantages can be achieved from the linearization characteristic of the GLDS kernel function as well.

Figure 13:
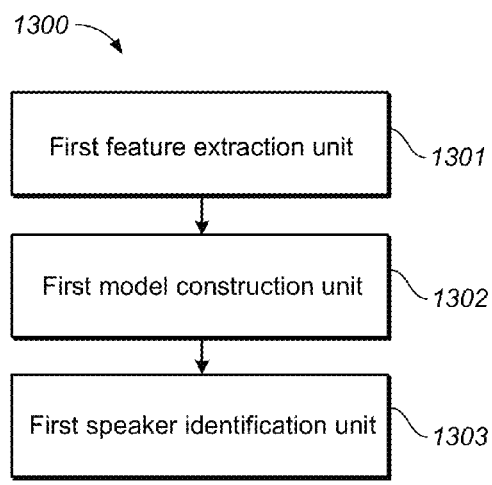
FIG. 13 illustrates a block diagram of a system of speaker identification for audio content in accordance with an example embodiment of the present invention.

FIG. 13 shows a block diagram of a system 13 of speaker identification for audio content in accordance with one example embodiment of the present invention is shown. As shown, the system 1300 comprises a first feature extraction unit 1301 configured to extract, from a first audio clip in the format, a plurality of spatial acoustic features across the multiple channels and location information, the first audio clip containing voices from a speaker, and a first model construction unit 1302 configured to construct a first model for the speaker based on the spatial acoustic features and the location information, the first model indicating a characteristic of the voices from the speaker. The system 1300 further comprises a first speaker identification unit 1303 configured to identify whether the audio content contains voices from the speaker based on the first model.

In some embodiments, the spatial acoustic features may include an intra-channel SDC feature and an inter-channel SDC feature. In these embodiments, the first feature extraction unit 1301 may comprise a cepstrum coefficient extraction unit configured to extract a cepstrum coefficient for each frame of the first audio clip in a frequency domain for each of the multiple channels, an intra-channel SDC feature determination unit configured to determine an intra-channel SDC feature for each of the multiple channels based on difference between the cepstrum coefficients for the channel over a predetermined number of frames, and an inter-channel SDC feature determination unit configured to determine an inter-channel SDC feature for each two of the multiple channels based on difference between the cepstrum coefficients for the two channels.

In some embodiments, the location information may include at least one of a direction of arrival or a distance of the speaker relative to an audio recording device. In these embodiments, the first model construction unit 1302 may comprise a kernel function determination unit configured to determine a GLDS kernel function based on the spatial acoustic features, and a GLDS model construction unit configured to construct the first model based on the location information and the GLDS kernel function.

In some embodiments, the GLDS model construction unit may be further configured to combine the spatial acoustic features, perform dimensional mapping on the combined spatial acoustic feature, and determine the GLDS kernel function based on the mapped spatial acoustic feature.

In some embodiments, the GLDS model construction unit may be further configured to perform dimensional mapping on each of the spatial acoustic features, combine the mapped spatial acoustic features, and determine the GLDS kernel function based on the combined spatial acoustic feature.

In some embodiments, the first speaker identification unit 1303 may comprise an audio content feature extraction unit configured to extract a plurality of spatial acoustic features across the multiple channels from the audio content, a closeness score determination unit configured to determine a closeness score between the spatial acoustic features of the audio content and the first model, and a score based identification unit configured to identify whether the audio content contains voices from the speaker based on the closeness score.

In some embodiments, the speaker is a first speaker, and the system 1300 may further comprise a location based determination unit configured to determine whether voices from a second speaker contain in the first audio clip based on the location information, a second model construction unit configured to constructing a second model for the second speaker based on the spatial acoustic features and the location information, the second model indicating a characteristic of the voices from the second speaker, and a second speaker identification unit configured to identify whether the audio content contains voices from the second speaker based on the second model.

In some embodiments, the system 1300 may further comprise a model updating unit configured to update the first model based on a second audio clip of the format.

In some embodiments, the model updating unit may comprise a second feature extraction unit configured to extract a plurality of spatial acoustic features across the multiple channels from the second audio clip, a weight determination unit configured to determine a weight for the first model based on the spatial acoustic features of the second audio clip, and a weight based combination unit configured to combining the spatial acoustic features of the second audio clip to the first model based on the determined weight.

In some embodiments, the weight determination unit may comprise a closeness score determination unit configured to determine a closeness score between the spatial acoustic features of the second audio clip and the first model, and a scored-based weight determination unit configured to determine the weight for the first model based on the closeness score.

In some embodiments, the weight determination unit may comprise a third model construction unit configured to construct a third model for the speaker based on the spatial information, the third model being a Gaussian mixture model, a probability determination unit configured to iteratively determine, in an EM process, a probability of the second audio clip containing voices from the speaker based on the third model, and a probability-based weight determination unit configured to determine the weight based on the probability.

In some embodiments, the probability-based weight determination unit may be further configured to determine a closeness score between the spatial acoustic features of the second audio clip and each first model, and determine the weight based on the probability and the closeness score.

In some embodiments, the probability determination unit configured to update the third model in each iteration of the EM process based on the probability determined in the iteration.

In some embodiments, the model updating unit may further comprise a closeness score determination unit configured to determine a closeness score between the spatial acoustic features of the second audio clip and each of the first model and a second model constructed from the first audio clip, a model merging unit configured to merge the first model with the second model if the closeness scores of the first model and of the second model are higher than a first threshold, and a new model construction unit configured to construct a new model based on the spatial acoustic feature of the second audio clip if the closeness scores of the first model and the second model are both lower than a second threshold.

For the sake of clarity, some optional components of the system 1300 are not shown in FIG. 13. However, it should be appreciated that the features as described above with reference to FIGS. 1-12 are all applicable to the system 1300. Moreover, the components of the system 1300 may be a hardware module or a software unit module. For example, in some embodiments, the system 1300 may be implemented partially or completely with software and/or firmware, for example, implemented as a computer program product embodied in a computer readable medium. Alternatively or additionally, the system 1300 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 14:
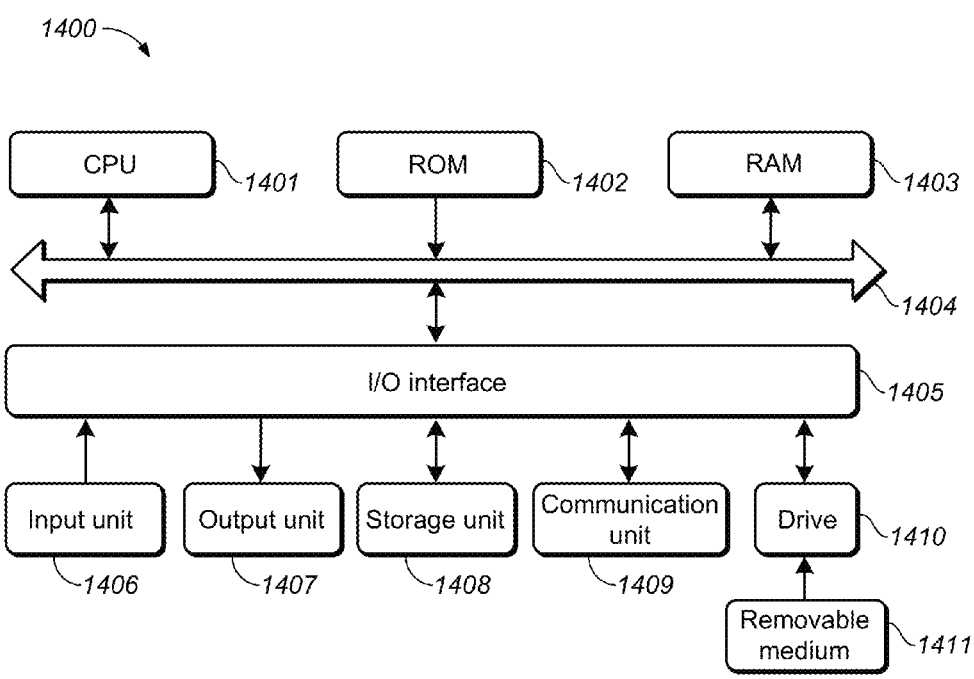
FIG. 14 illustrates a block diagram of an example computer system suitable for implementing embodiments of the present invention.

FIG. 14 shows a block diagram of an example computer system 800 suitable for implementing embodiments of the present invention. As shown, the computer system 800 comprises a central processing unit (CPU) 1401 which is capable of performing various processes in accordance with a program stored in a read only memory (ROM) 1402 or a program loaded from a storage section 1408 to a random access memory (RAM) 1403. In the RAM 1403, data required when the CPU 1401 performs the various processes or the like is also stored as required. The CPU 1401, the ROM 1402 and the RAM 1403 are connected to one another via a bus 1404. An input/output (I/O) interface 1405 is also connected to the bus 1404.

The following components are connected to the I/O interface 1405: an input section 1406 including a keyboard, a mouse, or the like; an output section 1407 including a display such as a cathode ray tube (CRT), a liquid crystal display (LCD), or the like, and a loudspeaker or the like; the storage section 1408 including a hard disk or the like; and a communication section 1409 including a network interface card such as a LAN card, a modem, or the like. The communication section 1409 performs a communication process via the network such as the internet. A drive 1410 is also connected to the I/O interface 1405 as required. A removable medium 1411, such as a magnetic disk, an optical disk, a magneto-optical disk, a semiconductor memory, or the like, is mounted on the drive 1410 as required, so that a computer program read therefrom is installed into the storage section 1408 as required.

Specifically, in accordance with embodiments of the present invention, the processes described above with reference to FIGS. 1-12 may be implemented as computer software programs. For example, embodiments of the present invention comprise a computer program product including a computer program tangibly embodied on a machine readable medium, the computer program including program code for performing methods 200, 500, 700, and/or 1000. In such embodiments, the computer program may be downloaded and mounted from the network via the communication section 1409, and/or installed from the removable medium 1411.

Generally speaking, various example embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present invention include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind to one skilled in the art to which these embodiments of the invention pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1

A method of speaker modeling and identification, comprising: spatial computation of SDC features based on spatial input audio, utilizing spatial GLDS-SVM in modeling and testing of a speaker identity model (SPID), unsupervised training of the speaker identity model using location information, and performing back-end fusion in detection of speaker identity.

EEE 2

The method according to EEE 1, wherein the SDC features are extracted across different channels in a spatial K-d-P-q domain.

EEE 3

The method according to EEE 1, wherein good advantages of fast computation, low space, online adaptation of GLDS have been taken of in modeling. Fast spatial computation via inner product either in parallel or in a cascade way is carried on after generalized linear discriminant sequences have been expanded.

EEE 4

The method according to EEE 1, wherein a powerful tool of EM process has been used in unsupervised training of speaker identity model. To this end, results acquired by a GMM model based on the location information are used to refine the SPID model iteratively, and the refined SPID model can conversely be of benefit to the next round of the GMM model.

EEE 5

The method according to EEE 4, wherein the EM process includes an intermediate bridge of using probability fusion to mitigate the divergence of two coordinate systems of the GMM model (which is in a polar system) and the SPID model (which is in a hyper plane in the generalized sequence).

EEE 6

The method according to EEE 4, wherein the Maximization step in the EM process includes a cluster split process and a cluster introduction process in order to compensate the person count difference between the GMM model and the SPID model.

EEE 7

A system of speaker identification for audio content, the audio content being of a format based on multiple channels, the system comprising:
a first feature extraction unit configured to extract, from a first audio clip in the format, a plurality of spatial acoustic features across the multiple channels and location information, the first audio clip containing voices from a speaker;
a first model construction unit configured to construct a first model for the speaker based on the spatial acoustic features and the location information, the first model indicating a characteristic of the voices from the speaker; and
a first speaker identification unit configured to identify whether the audio content contains voices from the speaker based on the first model.

EEE 8

The system according to EEE 7, wherein the spatial acoustic features include an intra-channel shifted delta cepstrum (SDC) feature and an inter-channel SDC feature, and
wherein the first feature extraction unit comprises:
a cepstrum coefficient extraction unit configured to extract a cepstrum coefficient for each frame of the first audio clip in a frequency domain for each of the multiple channels;
an intra-channel SDC feature determination unit configured to determine an intra-channel SDC feature for each of the multiple channels based on difference between the cepstrum coefficients for the channel over a predetermined number of frames; and
an inter-channel SDC feature determination unit configured to determine an inter-channel SDC feature for each two of the multiple channels based on difference between the cepstrum coefficients for the two channels.

EEE 9

The system according to EEE 7 or EEE 8, wherein the location information includes at least one of a direction of arrival or a distance of the speaker relative to an audio recording device, and
wherein the first model construction unit comprises:
a kernel function determination unit configured to determine a generalized linear discriminant sequence (GLDS) kernel function based on the spatial acoustic features; and
a GLDS model construction unit configured to construct the first model based on the location information and the GLDS kernel function.

EEE 10

The system according to EEE 9, wherein the GLDS model construction unit is further configured to:
combine the spatial acoustic features;
perform dimensional mapping on the combined spatial acoustic feature; and
determine the GLDS kernel function based on the mapped spatial acoustic feature.

EEE 11

The system according to EEE 9, wherein the GLDS model construction unit is further configured to:
perform dimensional mapping on each of the spatial acoustic features;
combine the mapped spatial acoustic features; and
determine the GLDS kernel function based on the combined spatial acoustic feature.

EEE 12

The system according to any one of EEEs 7 to 11, wherein the first speaker identification unit comprises:
an audio content feature extraction unit configured to extract a plurality of spatial acoustic features across the multiple channels from the audio content;
a closeness score determination unit configured to determine a closeness score between the spatial acoustic features of the audio content and the first model; and
a score based identification unit configured to identify whether the audio content contains voices from the speaker based on the closeness score.

EEE 13

The system according to any one of EEEs 7 to 12, wherein the speaker is a first speaker, and the system further comprising:
a location based determination unit configured to determine whether voices from a second speaker contain in the first audio clip based on the location information;
a second model construction unit configured to constructing a second model for the second speaker based on the spatial acoustic features and the location information, the second model indicating a characteristic of the voices from the second speaker; and
a second speaker identification unit configured to identify whether the audio content contains voices from the second speaker based on the second model.

EEE 14

The system according to any one of EEEs 7 to 13, further comprising:
a model updating unit configured to update the first model based on a second audio clip of the format.

EEE 15

The system according to EEE 14, wherein the model updating unit comprises:
a second feature extraction unit configured to extract a plurality of spatial acoustic features across the multiple channels from the second audio clip;
a weight determination unit configured to determine a weight for the first model based on the spatial acoustic features of the second audio clip; and
a weight based combination unit configured to combining the spatial acoustic features of the second audio clip to the first model based on the determined weight.

EEE 16

The system according to EEE 15, wherein the weight determination unit comprises:
a closeness score determination unit configured to determine a closeness score between the spatial acoustic features of the second audio clip and the first model; and
a scored-based weight determination unit configured to determine the weight for the first model based on the closeness score.

EEE 17

The system according to EEE 15, wherein the weight determination unit comprises:
a third model construction unit configured to construct a third model for the speaker based on the spatial information, the third model being a Gaussian mixture model;
a probability determination unit configured to iteratively determine, in an estimation-maximization (EM) process, a probability of the second audio clip containing voices from the speaker based on the third model; and
a probability-based weight determination unit configured to determine the weight based on the probability.

EEE 18

The system according to EEE 17, wherein the probability-based weight determination unit is further configured to:
determine a closeness score between the spatial acoustic features of the second audio clip and each first model; and
determine the weight based on the probability and the closeness score.

EEE 19

The system according to EEE 17 or EEE 18, wherein the probability determination unit configured to update the third model in each iteration of the EM process based on the probability determined in the iteration.

EEE 20

The method according to any one of EEEs 14 to 19, wherein the model updating unit further comprises:

a closeness score determination unit configured to determine a closeness score between the spatial acoustic features of the second audio clip and each of the first model and a second model constructed from the first audio clip;

a model merging unit configured to merge the first model with the second model if the closeness scores of the first model and of the second model are higher than a first threshold; and a new model construction unit configured to construct a new model based on the spatial acoustic feature of the second audio clip if the closeness scores of the first model and the second model are both lower than a second threshold.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A method of speaker identification for audio content, the audio content being of a format based on multiple channels, the method comprising:

extracting, from a first audio clip in the format, a plurality of spatial acoustic features across the multiple channels and location information, the first audio clip including a plurality of frames for each of a plurality of channels, the first audio clip including audio content corresponding to voices from a speaker, the spatial acoustic features including acoustic characteristics of the voices from the speaker;

constructing a first model for the speaker based on the spatial acoustic features and the location information, the first model indicating a characteristic of the voices from the speaker; and identifying whether the audio content contains voices from the speaker based on the first model, wherein the spatial acoustic features include an intra-channel shifted delta cepstrum (SDC) feature and an inter-channel SDC feature, and wherein extracting the spatial acoustic features from the first audio clip comprises:

for each of the multiple channels, extracting a cepstrum coefficient for each frame of the first audio clip in a frequency domain;

determining an intra-channel SDC feature for each of the multiple channels based on difference between the cepstrum coefficients for the channel over a predetermined number of frames; and determining an inter-channel SDC feature for each two of the multiple channels based on difference between the cepstrum coefficients for the two channels.

2. The method according to claim 1, wherein the location information includes at least one of a direction of arrival or a distance of the speaker relative to an audio recording device, and wherein constructing a first model for the speaker based on the spatial acoustic features and the location information comprises:

determining a generalized linear discriminant sequence (GLDS) kernel function based on the spatial acoustic features; and constructing the first model based on the location information and the GLDS kernel function.

3. The method according to claim 2, wherein determining the GLDS kernel function based on the spatial acoustic features comprises:

combining the spatial acoustic features;

performing dimensional mapping on the combined spatial acoustic feature; and determining the GLDS kernel function based on the mapped spatial acoustic feature.

4. The method according to claim 2, wherein determining the GLDS kernel function based on the spatial acoustic features comprises:

performing dimensional mapping on each of the spatial acoustic features;

combining the mapped spatial acoustic features; and determining the GLDS kernel function based on the combined spatial acoustic feature.

5. The method according to claim 1, wherein identifying whether the audio content contains voices from the speaker based on the first model comprises:

extracting a plurality of spatial acoustic features across the multiple channels from the audio content;

determining a closeness score between the spatial acoustic features of the audio content and the first model; and identifying whether the audio content contains voices from the speaker based on the closeness score.

6. The method according to claim 1, wherein the speaker is a first speaker, and the method further comprising:

determining whether voices from a second speaker contain in the first audio clip based on the location information;

constructing a second model for the second speaker based on the spatial acoustic features and the location information, the second model indicating a characteristic of the voices from the second speaker; and identifying whether the audio content contains voices from the second speaker based on the second model.

7. The method according to claim 1, further comprising:
updating the first model based on a second audio clip of the format.

8. The method according to claim 7, wherein updating the first model based on the second audio clip comprises:

extracting a plurality of spatial acoustic features across the multiple channels from the second audio clip;

determining a weight for the first model based on the spatial acoustic features of the second audio clip; and combining the spatial acoustic features of the second audio clip to the first model based on the determined weight.

9. The method according to claim 8, wherein determining a weight for the first model based on the spatial acoustic features of the second audio clip comprises:

determining a closeness score between the spatial acoustic features of the second audio clip and the first model; and determining the weight for the first model based on the closeness score.

10. The method according to claim 8, wherein determining a weight for the first model based on the spatial acoustic features of the second audio clip comprises:

constructing a third model for the speaker based on the spatial information, the third model being a Gaussian mixture model;

iteratively determining, in an estimation-maximization (EM) process, a probability of the second audio clip containing voices from the speaker based on the third model; and determining the weight based on the probability.

11. The method according to claim 10, wherein determining the weight based on the probability comprises:

determining a closeness score between the spatial acoustic features of the second audio clip and each first model; and determining the weight based on the probability and the closeness score.

12. The method according to claim 10, further comprising:

updating the third model in each iteration of the EM process based on the probability determined in the iteration.

13. The method according to claim 7, wherein updating the first model based on the second audio clip further comprises:

determining a closeness score between the spatial acoustic features of the second audio clip and each of the first model and a second model constructed from the first audio clip;

merging the first model with the second model if the closeness scores of the first model and of the second model are higher than a first threshold; and constructing a new model based on the spatial acoustic feature of the second audio clip if the closeness scores of the first model and the second model are both lower than a second threshold.

14. A computer program product for speaker identification for audio content, the computer program product being tangibly stored on a non-transitory computer-readable medium and comprising machine executable instructions which, when executed, cause the machine to perform steps of the method according to claim 1.

15. A non-transitory computer readable medium having software stored thereon, the software including instructions for controlling one or more devices to perform a method of speaker identification for audio content, the audio content being of a format based on multiple channels, the method comprising:

extracting, from a first audio clip in the format, a plurality of spatial acoustic features across the multiple channels and location information, the first audio clip including a plurality of frames for each of a plurality of channels, the first audio clip including audio content corresponding to voices from a speaker, the spatial acoustic features including acoustic characteristics of the voices from the speaker;

constructing a first model for the speaker based on the spatial acoustic features and the location information, the first model indicating a characteristic of the voices from the speaker; and identifying whether the audio content contains voices from the speaker based on the first model, wherein the location information includes at least one of a direction of arrival or a distance of the speaker relative to an audio recording device and wherein constructing a first model for the speaker based on the spatial acoustic features and the location information comprises:

determining a generalized linear discriminant sequence (GLDS) kernel function based on the spatial acoustic features; and constructing the first model based on the location information and the GLDS kernel function.

16. The non-transitory computer readable medium of claim 15, wherein determining the GLDS kernel function based on the spatial acoustic features comprises:

combining the spatial acoustic features;

performing dimensional mapping on the combined spatial acoustic feature; and determining the GLDS kernel function based on the mapped spatial acoustic feature.

17. The non-transitory computer readable medium of claim 15, wherein determining the GLDS kernel function based on the spatial acoustic features comprises:

performing dimensional mapping on each of the spatial acoustic features;

combining the mapped spatial acoustic features; and determining the GLDS kernel function based on the combined spatial acoustic feature.

* * * * *